US011902426B2

(12) United States Patent
Shrivastava et al.

(10) Patent No.: US 11,902,426 B2
(45) Date of Patent: Feb. 13, 2024

(54) EFFICIENT STORAGE OF BLOCKCHAIN IN EMBEDDED DEVICE

(71) Applicant: Redpine Signals, Inc., San Jose, CA (US)

(72) Inventors: Ananya Shrivastava, Chhattisgarh (IN); Mohammed Sumair, Uttarakhand (IN); Joydeep Kumar Devnath, Assam (IN); Suyash Kandele, Chhattisgarh (IN); Govardhan Mattela, Hyderabad (IN)

(73) Assignee: Ceremorphic, Inc., San Jose, CA (US)

( * ) Notice: Subject to any disclaimer, the term of this patent is extended or adjusted under 35 U.S.C. 154(b) by 418 days.

(21) Appl. No.: 17/359,545

(22) Filed: Jun. 26, 2021

(65) Prior Publication Data

US 2022/0417008 A1   Dec. 29, 2022

(51) Int. Cl.
*H04L 9/08* (2006.01)
*H04L 9/32* (2006.01)
*H04L 9/00* (2022.01)

(52) U.S. Cl.
CPC .......... *H04L 9/0825* (2013.01); *H04L 9/0891* (2013.01); *H04L 9/3242* (2013.01);
(Continued)

(58) Field of Classification Search
CPC ... H04L 9/0825; H04L 9/0891; H04L 9/3242; H04L 9/3247; H04L 9/3263; H04L 9/50; H04L 2209/56; H04L 9/3268
See application file for complete search history.

(56) References Cited

U.S. PATENT DOCUMENTS

| | | | |
|---|---|---|---|
| 11,075,891 B1 * | 7/2021 | Long | H04L 9/3213 |
| 2018/0109541 A1 * | 4/2018 | Gleichauf | H04W 8/24 |

(Continued)

FOREIGN PATENT DOCUMENTS

| | | | | |
|---|---|---|---|---|
| AU | 2019201798 A1 * | 10/2020 | | |
| CN | 108683630 A * | 10/2018 | ........... | G06F 21/577 |

(Continued)

OTHER PUBLICATIONS

Xiaohai Dai , LVQ: A Lightweight Verifiable Query Approach for Transaction History in Bitcoin, 2020 IEEE 40th International Conference on Distributed Computing Systems (ICDCS), Date of Conference: Nov. 29, 2020-Dec. 1, 2020, 11 pages (Year: 2020).*

(Continued)

*Primary Examiner* — Shahriar Zarrineh
(74) *Attorney, Agent, or Firm* — File-EE-Patents.com; Jay A. Chesavage

(57) ABSTRACT

A lightweight node in a decentralized network includes stores a blockchain with a plurality of blocks. The lightweight node adds blocks to the blockchain successively. A given block having a header and a body. The header includes a data merkle root generated as a root hash of a data merkle tree with one or more leaf nodes that are one or more hashes. A given hash being a hash of a combination of (1) a public key associated with a lightweight node of the decentralized network and (2) of a validity value associated with the public key indicating whether the public key is a valid public key. The data merkle root being insufficient for restoring the data merkle tree. But with a public key and an intermediate hash the date merkle root is sufficient for at least partly verifying the public key.

14 Claims, 16 Drawing Sheets

(52) U.S. Cl.
CPC .......... *H04L 9/3247* (2013.01); *H04L 9/3263* (2013.01); *H04L 9/50* (2022.05); *H04L 2209/56* (2013.01)

(56) References Cited

U.S. PATENT DOCUMENTS

| | | | | |
|---|---|---|---|---|
| 2018/0247191 | A1* | 8/2018 | Katz | G06N 3/006 |
| 2019/0164153 | A1* | 5/2019 | Agrawal | G06Q 20/383 |
| 2019/0172026 | A1* | 6/2019 | Vessenes | G06Q 20/3674 |
| 2019/0279172 | A1* | 9/2019 | Duffield | H04L 9/3247 |
| 2019/0372779 | A1* | 12/2019 | Monica | H04L 9/0637 |
| 2020/0201560 | A1* | 6/2020 | Yang | G06F 3/0655 |
| 2020/0252205 | A1* | 8/2020 | Padmanabhan | G06F 9/466 |
| 2020/0252221 | A1* | 8/2020 | Zamani | H04L 9/0869 |
| 2020/0389519 | A1* | 12/2020 | Bartolucci | H04L 9/3236 |
| 2021/0012336 | A1* | 1/2021 | Zhuo | H04L 9/006 |
| 2021/0021432 | A1* | 1/2021 | Atkins | H04L 9/3242 |
| 2021/0036857 | A1* | 2/2021 | Qiu | H04L 9/3247 |
| 2021/0157790 | A1* | 5/2021 | Zamani | H04L 9/50 |
| 2021/0281422 | A1* | 9/2021 | Diehl | H04L 9/0825 |
| 2022/0399988 | A1* | 12/2022 | Barger | H04L 9/0643 |

FOREIGN PATENT DOCUMENTS

| | | | | |
|---|---|---|---|---|
| CN | 110009334 | A * | 7/2019 | G06F 16/9027 |
| CN | 110011800 | A * | 7/2019 | G06Q 20/38215 |
| CN | 110048850 | A * | 7/2019 | |
| CN | 110709875 | A * | 1/2020 | H04L 9/0637 |
| CN | 112085504 | A * | 12/2020 | G06F 16/2228 |
| CN | 112119620 | A * | 12/2020 | H04L 12/56 |
| CN | 113518005 | A * | 10/2021 | |
| CN | 113612810 | A * | 11/2021 | |
| EP | 3496329 | A1 * | 6/2019 | G06F 21/31 |
| EP | 3852305 | A1 * | 7/2021 | G06Q 20/3827 |
| EP | 3879749 | A1 * | 9/2021 | |
| EP | 3945702 | A1 * | 2/2022 | |
| GB | 2592211 | A * | 8/2021 | G06F 15/17312 |
| GB | 2596347 | A * | 12/2021 | G06Q 20/389 |
| GB | 2598942 | A * | 3/2022 | G06F 21/10 |
| GB | 2600769 | A * | 5/2022 | G06F 16/2455 |
| GB | 2602347 | A * | 6/2022 | G06Q 20/065 |
| GB | 2608179 | A * | 12/2022 | G06F 16/27 |
| GB | 2608182 | A * | 12/2022 | G06F 21/64 |
| JP | 2019185774 | A * | 10/2019 | G06F 16/1824 |
| KR | 20190140550 | A * | 12/2019 | |
| KR | 20210001034 | A * | 1/2021 | |
| KR | 20200100451 | A * | 8/2022 | |
| WO | WO-2018201237 | A1 * | 11/2018 | G06Q 20/06 |
| WO | WO-2019008532 | A1 * | 1/2019 | G06F 8/31 |
| WO | WO-2020165680 | A1 * | 8/2020 | G06Q 20/065 |
| WO | WO-2020240296 | A1 * | 12/2020 | H04L 9/3239 |

OTHER PUBLICATIONS

Li Duan, Flexible certificate revocation list for efficient authentication in IoT , IOT '18: Proceedings of the 8th International Conference on the Internet of Things, Oct. 2018, Article No. 7, pp. 1-8, https://doi.org/10.1145/3277593.3277595 (Year: 2018).*

* cited by examiner

Initial Enrollment of Lightweight Node

Enrollment of Lightweight Nodes to each other

OEM & IOT Credentials

Enrollment of Untrusted IOT

Genesis Block 310

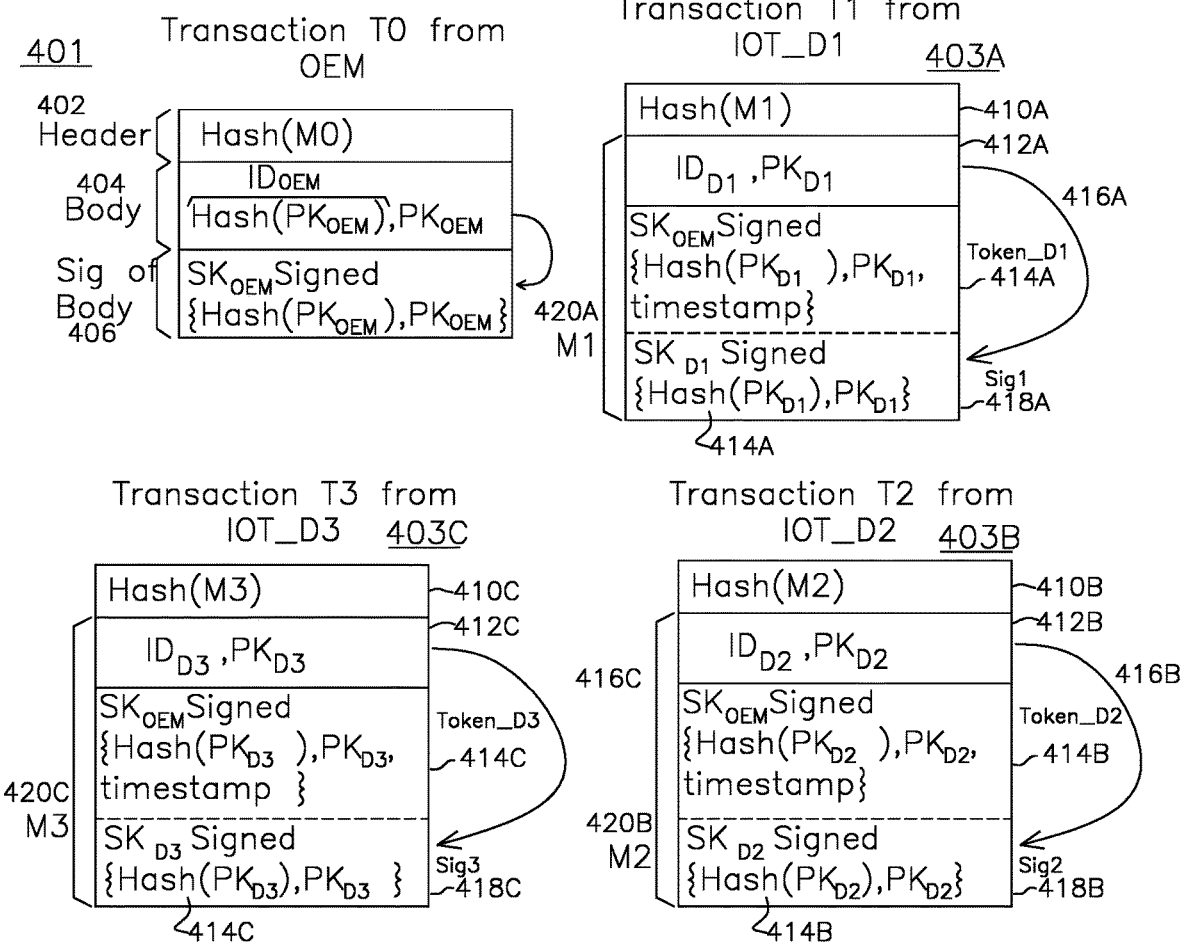

Figure 4
IOT Data Structures of IOT D0

Transaction T0 from OEM (401): Header (402), Body (404), Sig of Body (406) — Hash(M0), $ID_{OEM}$, Hash($PK_{OEM}$),$PK_{OEM}$, $SK_{OEM}$Signed{Hash($PK_{OEM}$),$PK_{OEM}$} (420A M1 arrow)

Transaction T1 from IOT_D1 (403A): Hash(M1) (410A), $ID_{D1}$,$PK_{D1}$ (412A), $SK_{OEM}$Signed{Hash($PK_{D1}$),$PK_{D1}$, timestamp} — Token_D1 (414A, 416A), $SK_{D1}$ Signed{Hash($PK_{D1}$),$PK_{D1}$} — Sig1 (418A), 414A Transaction T3 from IOT_D3 (403C): Hash(M3) (410C), $ID_{D3}$,$PK_{D3}$ (412C), $SK_{OEM}$Signed{Hash($PK_{D3}$),$PK_{D3}$, timestamp} — Token_D3 (414C, 416C), $SK_{D3}$ Signed{Hash($PK_{D3}$),$PK_{D3}$} — Sig3 (418C), 420C M3, 414C Transaction T2 from IOT_D2 (403B): Hash(M2) (410B), $ID_{D2}$,$PK_{D2}$ (412B), $SK_{OEM}$Signed{Hash($PK_{D2}$),$PK_{D2}$, timestamp} — Token_D2 (414B, 416B), $SK_{D2}$ Signed{Hash($PK_{D2}$),$PK_{D2}$} — Sig2 (418B), 420B M2, 414B

Figure 5
IOT D1 Example Transaction T1 Verification (against T0) — 500

502: IOT-D1 verifies Token_D1=$SK_{OEM}$ signed{H($PK_{D1}$), $PK_{D1}$, timestamp} Sig was done by $SK_{OEM}$, Sig verification is done using $PK_{OEM}$ from T0

504: IOT-D1 verifies Sig1=$SK_{D1}$ signed{H($PK_{D1}$),$PK_{D1}$,Token_D1) Sig was done by $SK_{D1}$, Sig verification is done using $PK_{D1}$ from T1

Enrollment of IOT-D2 & IOT-D3 seen by IOT-D1

Block Structure (Blk ID=B1)

Secure Channel Establishment

Example IOT

Block Structure

Block Chain

End Block

Figure 12
Storage Space Comparison

1200

| S No | BlockChain components | Size (with optimization) | For x=100; RB=50, n=16 (optimized) | For x=100; RB=50, n=16 (not optimized) |
|---|---|---|---|---|
| A | Block Header | 232 B | 232 B | 200B (w/o Data Merkle Root) |
| B | Revocation List | 96*# Blks w/at least 1 revocation | 4.8 KB | 25.6 KB = 32 B * # revoked public keys |
| C | Blockchain after x number of blocks | 232*x*96*RB | 28 KB | 455.2 KB (200B+n*256B)*x+ 25.6KB |
| D | Intermediate hash list (n=number public keys enrolled in one block) | $32*[\text{ceil}\{\log_2(n)\}+n]$ if all public keys revoked | 640B | NA |
| | Total (C+D) | | 28.64 KB | 455.2KB |

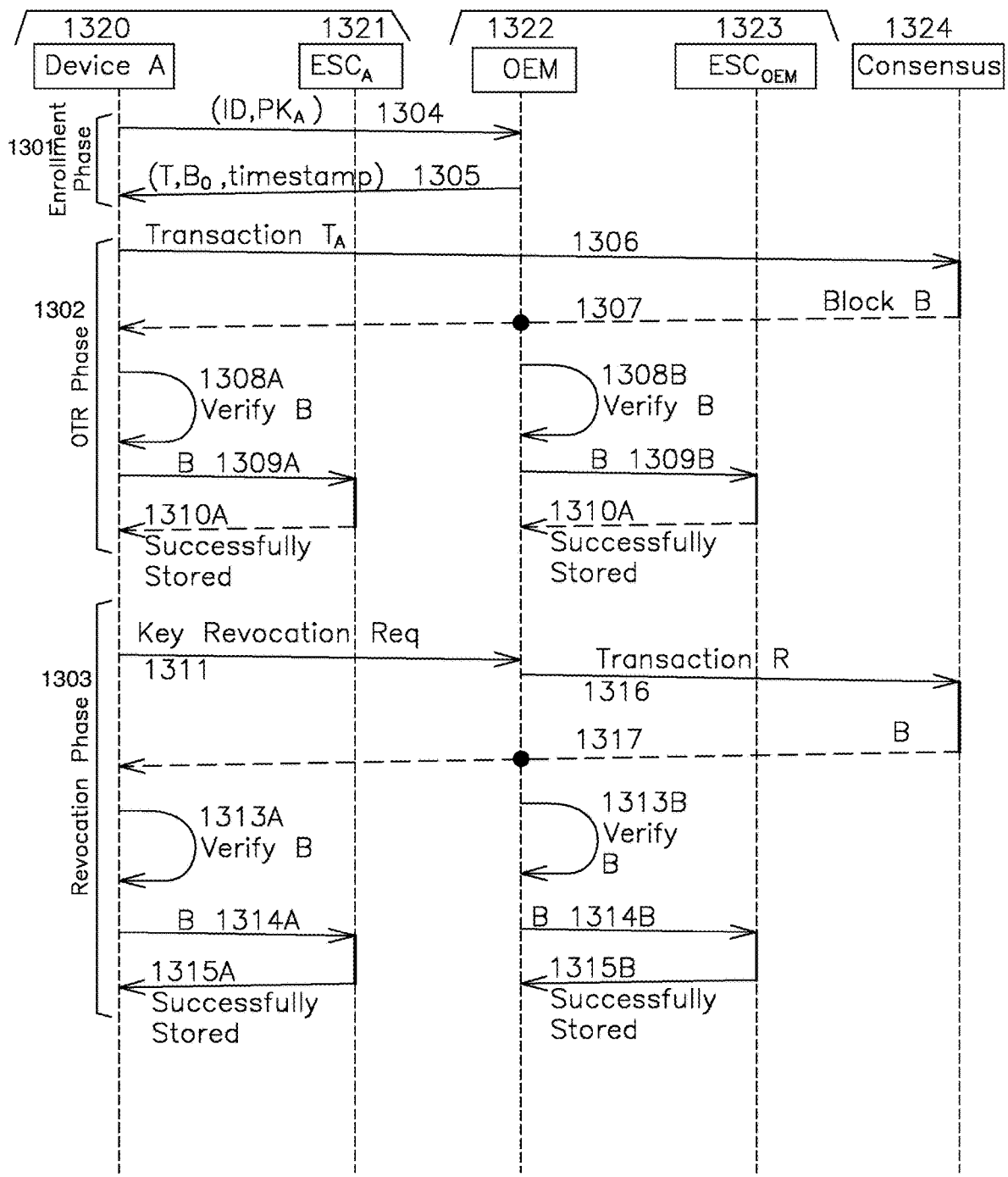

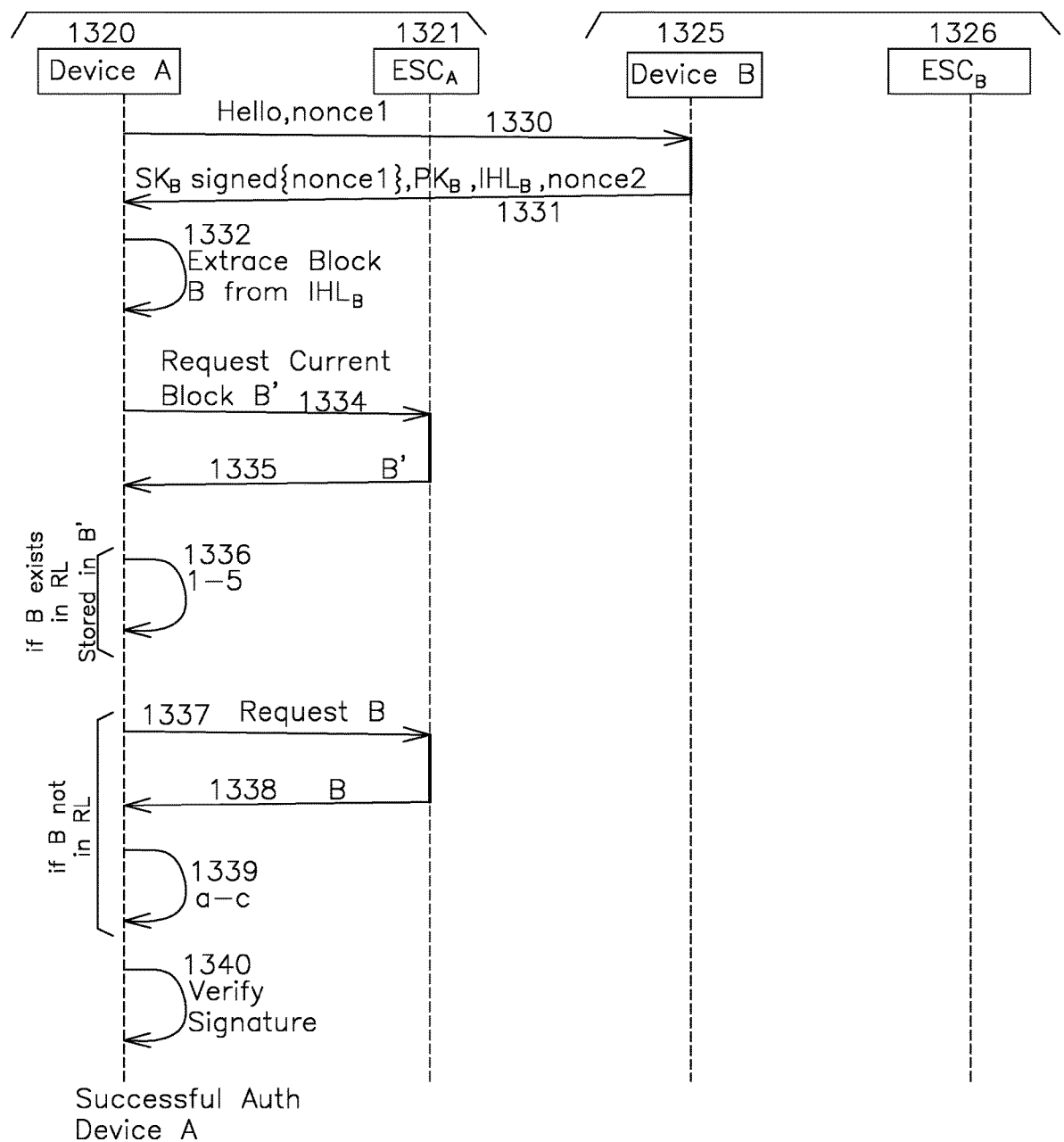

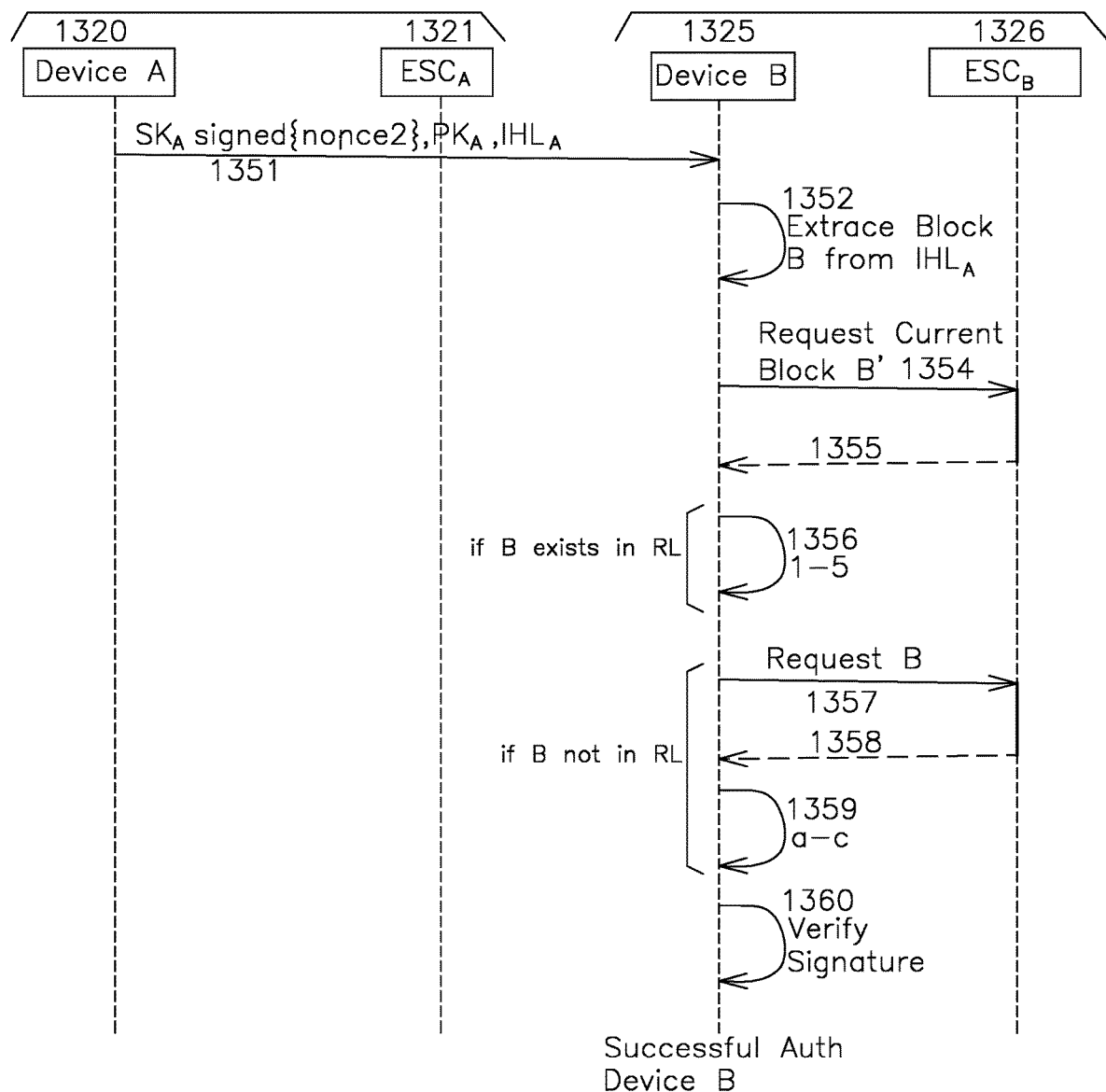

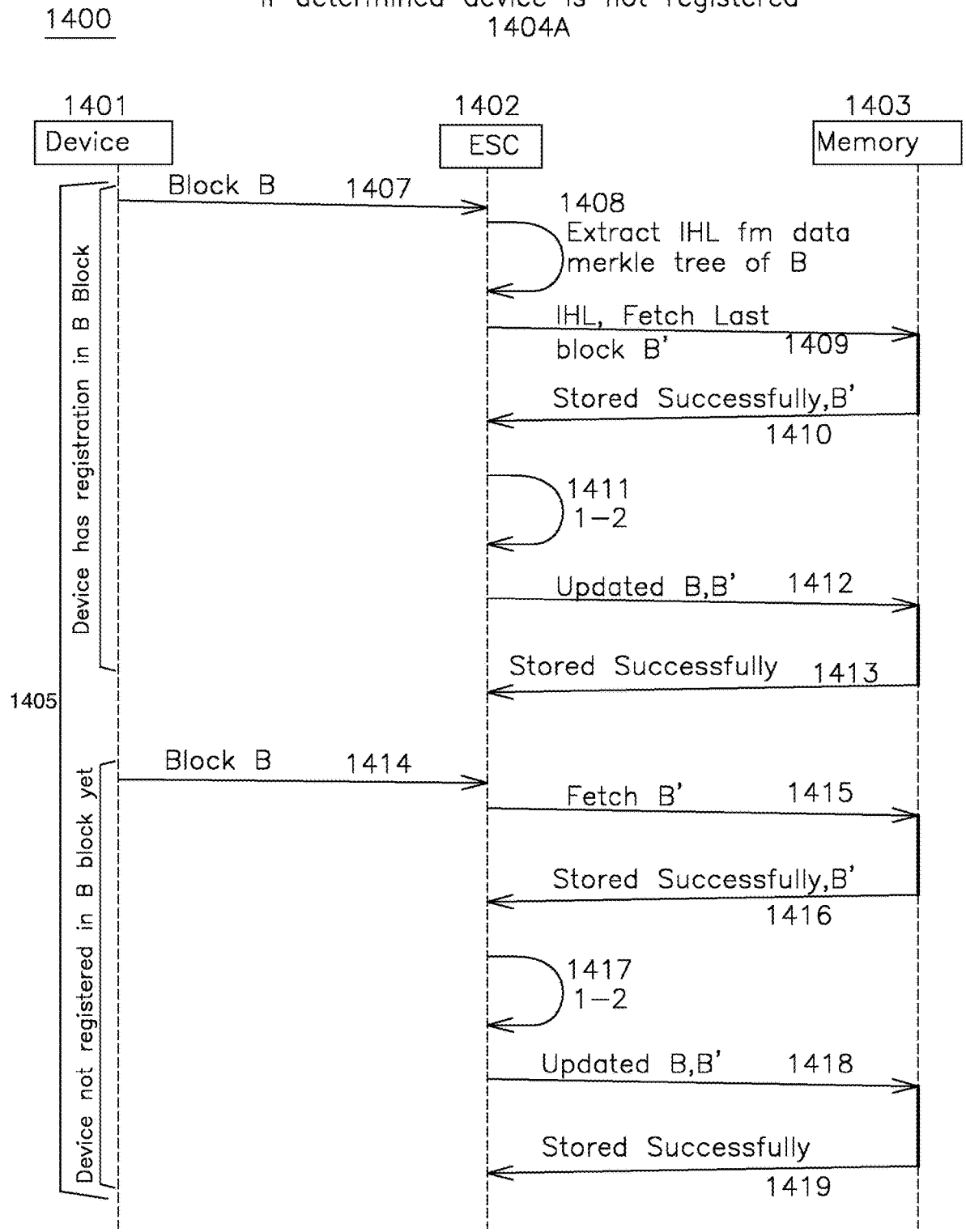

If determined that device is registered 1404B

EFFICIENT STORAGE OF BLOCKCHAIN IN EMBEDDED DEVICE

FIELD OF TECHNOLOGY

Embodiments herein relate to efficient storage for blockchains in a decentralized network of lightweight nodes. More particularly, some embodiments relate to efficient storage for blockchains in a centralized network of lightweight nodes, wherein the lightweight nodes store only block headers and a revocation list rather than a full copy of a blockchain.

BACKGROUND

Networks of lightweight nodes (e.g. devices, such as for example, Internet of Things (IOT) devices) are becoming increasing common in recent years. These networks often need security that restricts such networks to enrolled and authenticated devices only. This security often relies on public-key infrastructure (PKI) to bind a node's public key to its identity. This binding is performed by a certificate issued by a trusted party a.k.a. a certificate authority (CA).

The certificate is a digital document signed by the certificate authority with a private key of the CA. It binds a public key of the lightweight node with some identity. Attributes/fields of a certificate may include an owner's name, organization name, issuer, expiration date, a public key and a digital signature by the CA. The most common digital certificate standard is X.509 having a size of 3 KB.

An existing digital certificate verification process may include verifying that (a) it is correctly signed by a trusted party (CA), (b) has not expired, and (c) it contains all necessary fields as per X.509 standard. The above security procedures rely on the PKI infrastructure with its public and private signing keys (for example cryptographic keys) and the prominent role of the CA. The CA is often involved in both an initial enrollment of a lightweight node and in later authentication of a lightweight node to another lightweight node of the decentralized network.

Another aspect of networks of lightweight nodes relates to storage of blockchains by lightweight nodes. In public blockchains such as Bitcoin or Ethereum there are significant storage requirements for nodes (e.g. up to 300 GB). There are both full nodes and lightweight nodes in these blockchain networks where a full node stores the entire blockchain, but a lightweight node just stores the block headers (which are only about 1/1000 of the size of blockchain and contains "Transaction Merkle root" with other required fields).

With lightweight nodes only storing the block headers, operations such as authentication of lightweight nodes presents challenges. For verifying a transaction efficiently, lightweight nodes use a simplified payment verification (SPV) technique, in which they download block headers and the transaction (to be verified) from full nodes. Full nodes also provide the lightweight nodes with other data needed to verify transactions. Thus, traditionally, lightweight nodes are reliant on full nodes of the network for authenticating other lightweight nodes.

SUMMARY

In some embodiments a lightweight node is in a decentralized network that includes at least a plurality of other lightweight nodes. The lightweight node includes at least a memory storing at least a blockchain, wherein the blockchain includes at least a plurality of blocks, wherein the lightweight node adds blocks to the blockchain successively, a given block of the blockchain including at least a header and a body, the header including at least a data merkle root, the data merkle root having been generated as a root hash of a data merkle tree with one or more leaf nodes that are one or more hashes, a given hash of the one or more hashes being a hash of a combination of (1) a public key associated with a lightweight node of the decentralized network and (2) of a validity value associated with the public key indicating whether the public key is a valid public key on the decentralized network. And the data merkle root is insufficient for restoring the data merkle tree. But with at least a public key and an intermediate hash the date merkle root is sufficient for at least partly verifying the public key.

Some embodiments provide a method of authentication performed with a first lightweight node on a decentralized network that has a plurality of lightweight nodes, including at least the first lightweight node and a second lightweight node.

The method includes the first lightweight node at least transmitting at least a first nonce to the second lightweight node.

The method further includes the first lightweight node receiving from the second lightweight node at least a public key associated with the second lightweight node, an identifier associated with a block of a blockchain in which an enrollment of the second lightweight node was recorded, an intermediate merkle tree hash associated with the second lightweight node, and a signature created with at least the first nonce and a private key associated with the second lightweight node.

The method further includes the first lightweight node determining if the block is referenced on a revocation list that identifies one or more revoked public keys, and (a) if the block is referenced then determining if a data merkle root stored on the revocation list for the block matches a data merkle root computed with at least the public key and the intermediate merkle tree hash; and (b) if the two data merkle roots match then determining if a hash of the public key and an validity value indicating revocation matches a hash on the intermediate hash and responsive to a match determining that the public key is revoked and that the second lightweight node cannot be authenticated.

Some embodiments provide an additional method for authentication within a decentralized network, the decentralized network having a plurality of lightweight nodes including a first and a second lightweight node. The method comprising:

Initiating an authentication sequence from the first to the second lightweight node, including at least:
  (a) Self-verifying the validity of the first lightweight node on the blockchain;
  (b) Ensuring an valid public key is enrolled in the decentralized network;
  (c) Verifying ownership of the public key assigned to the second lightweight node by and the first lightweight node.

BRIEF DESCRIPTION OF THE DRAWINGS

Representative embodiments are is illustrated by way of example and not by limitation in the accompanying figures, in which:

FIG. 4 is a simplified block diagram illustrating various IOT data structures for a both an OEM TO transaction and for transactions T1, T2, and T3, consistent with some embodiments.

FIG. 5 is a process flow diagram illustrating the verification of signatures for transaction T1 of FIG. 4.

FIG. 12 is a chart illustrating a storage space analysis consistent with some embodiments, comparing space requirements for some optimized and non-optimized embodiments.

FIGS. 13A-13C are sequence diagrams illustrating transmissions related to device enrollment, one-time registration (OTR) and certificate registration processes on the blockchain consistent with some embodiments.

FIGS. 14A-14B are sequence diagrams illustration transmissions related to storing and update operations related to blockchain data structures.

Figure 1A:
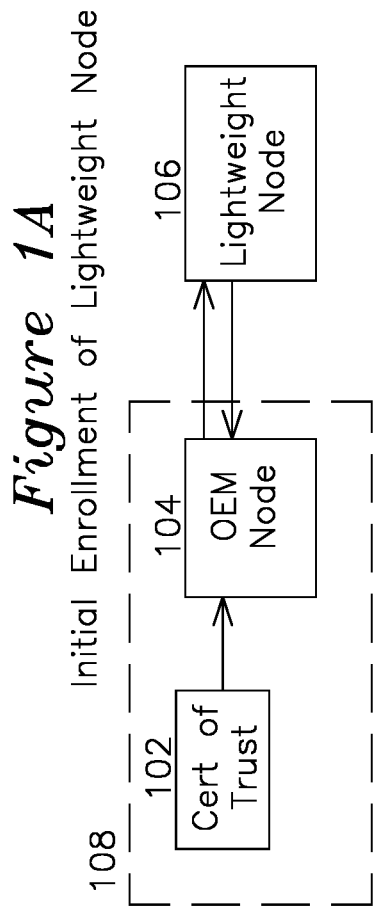
FIG. 1A is a simplified block diagram illustrating a first stage of an initial enrollment of a lightweight node in a decentralized network, consistent with some embodiments, showing the lightweight node interacting with an OEM node.

Skilled artisans appreciate that elements in the Figures are illustrated for simplicity and clarity and have not necessarily been drawn to scale. For example, the dimensions of some of the elements in the Figures may be exaggerated relative to the other elements to improve understanding of the embodiments of the present invention.

DETAILED DESCRIPTION

It is to be understood that the disclosed embodiments are merely exemplary of the invention, which may be embodied in various forms. It is also to be understood that multiple references to "some embodiments" are not necessarily referring to the same embodiments.

The term "full node" has its ordinary meaning and includes a node that includes a complete local copy of a blockchain.

The term "lightweight node" has its ordinary meaning and includes a node that does not include a complete local copy of a blockchain. In some embodiments a lightweight node only has block headers and not complete blocks in a local copy of a blockchain. In these embodiments block bodies are empty. In some embodiments, a light weight node has a revocation list in its body. Specific embodiments are configurations are illustrated in the drawings and discussed below.

References to an "OEM node" are not limited to "original equipment manufacturer" nodes. As used herein, an OEM node is merely an example of a node that is configured to perform at least some of the duties of a certificate authority (CA) and/or a node that is trusted and configured to provide the functions described herein for an OEM node. As used herein, an "OEM node" is not necessarily an original equipment manufacturer node. In some embodiments, an OEM node is a full node. In some embodiments, an OEM node is a lightweight node.

As used in this document, including in the claims, the term "trusted node" is a node that is configured to perform at least some of the duties of a certificate authority (CA) and/or a node that is trusted and configured to provide the functions described herein for an trusted node. However, a trusted node is not necessarily an original equipment manufacturer node. In some embodiments, a trusted node is a full node. In some other embodiments, a trusted node is a lightweight node.

As used in this document, an "enrolled node" is a node that is registered in a network, such as a decentralized network. In some embodiments an enrolled node is associated with a public key that is registered with the decentralized network and that has not been revoked. In some further embodiments, the public key of an enrolled node is registered with the decentralized network by being included a transaction that is included in a block that has been accepted via a lightweight consensus algorithm as part of a blockchain for the decentralized network.

The term "authenticated node" is a node that is authenticated to at least one other node in a network. In some embodiments two nodes that are authenticated to each other establish a secure channel for communication between them.

Part One

Involvement of a certificate authority (CA) in both the initial enrollment of a lightweight node and in the later authentication of a lightweight node to another lightweight node of the decentralized network creates several challenges. A public-key infrastructure (PKI) with CA involvement in both the initial enrollment of a lightweight node and in the later authentication of a lightweight node creates a centralized system for managing keys and identities. This is especially true of the authentication process which happens repeatedly in the decentralized network. This centralized structure creates a single point of failure. For example, it presents a single target for malicious attacks.

Involvement of the CA during authentication processes brings additional delay. A CA provides an OCSP (e.g. Online Certificate Status Protocol) message to a lightweight node, which then attaches the OCSP along with a certificate for transmission to an authenticator for authentication. The OCSP is a time-stamped status message which is signed by the CA. It proves that the certificate's status is "valid" or "revoked." Communication with the CA to obtain the OSCP message may cause delay or other impediments.

CA involvement during the authentication process is also prone to availability issues. For example, the CA servers are prone to denial of service (DoS) attacks. Also, while involvement of the CA during authentication brings centralized trust to the authentication process, this is also a vulnerability.

For decentralized networks that each include lightweight nodes in addition to full nodes, it is desirable to overcome one or more of the above limitations while utilizing only lightweight nodes. That is, authentication of nodes to each other is performed on a decentralized network while minimizing or avoiding reliance by the lightweight nodes on the full nodes.

Thus, one design consideration for some embodiments is to make lightweight nodes self-dependent by running a blockchain software having a lightweight consensus algorithm, such as for example, a Neurochain algorithm inside a lightweight node. (See: https://www.neurochaintech.io/pdf/NeuroChain_White_Paper.pdf). Although Neurochain is mentioned in this document, this disclosure is not limited to using Neurochain. Instead, other lightweight consensus algorithms may be used.

Another design consideration for some embodiments is to limit the rule of the CA by allowing the CA to be involved in the initial enrollment of a lightweight node on the decentralized network but not having a role for the CA in authentication between lightweight nodes of the centralized network. That is, inter-device authentication is decentralized.

Another design consideration for some embodiments is reduced communication cost and overhead on a decentralized network.

Some embodiments of a decentralized network have a plurality of lightweight nodes, for example Internet-of-Things devices (IoT devices) or mobile devices such as a client operating on the Microsoft Edge mobile platform. A given lightweight node may initially be untrusted and not enrolled in the decentralized network. The untrusted lightweight node may enter into an enrollment process which has a first stage and a second stage. The first stage includes interaction with an OEM node. The second stage involves interaction with a plurality of other lightweight nodes to obtain a registration on the decentralized network. Once enrolled, the lightweight node may engage in authentication communications with other lightweight nodes of the decentralized network to establish at least one secure communication channels.

Referencing FIG. 1, a lightweight node 106 interacts with a system 108 that includes an OEM node 104 that has received a certificate of trust 102 from a CA server (not shown). This interaction occurs locally in a closed environment. In one exemplary embodiment, this interaction comprises a first stage for enrolling lightweight node 106 in a decentralized network.

Figure 1B:
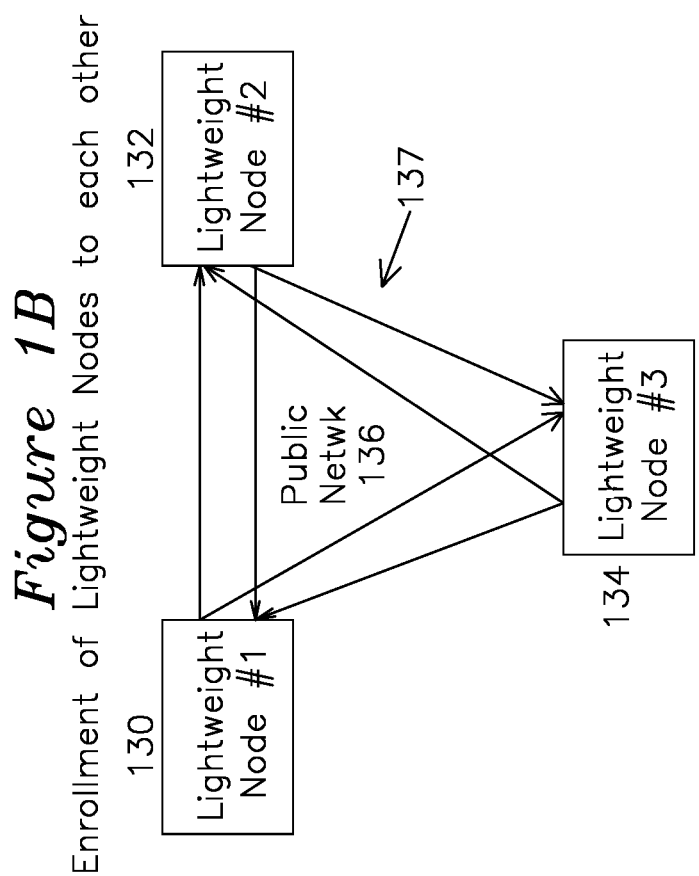
FIG. 1B is a simplified block diagram illustrating a second stage of an initial enrollment of the lightweight node in a decentralized network, consistent with some embodiments, showing a lightweight node interacting with two other lightweight nodes to reach consensus.

Referencing FIG. 1B, initially unenrolled lightweight nodes 130, 132, and 134 interact on a public network, such as among others the Internet, a local area network, and a cellular network. This interaction is a second stage of an enrollment in which all three lightweight nodes 130, 132, and 134 are enrolling one other a decentralized network 137. Once enrolled, the lightweight nodes 130, 132, and 134 then define at least a portion of decentralized network 137. The above interaction among lightweight nodes 130, 132, and 134 includes at least reaching a consensus to enroll one another in the decentralized network. Consensus is reached via a lightweight consensus algorithm. No specific lightweight consensus algorithm is required, but in some embodiments the lightweight consensus algorithm comprises a Neurochain algorithm.

Figure 2:
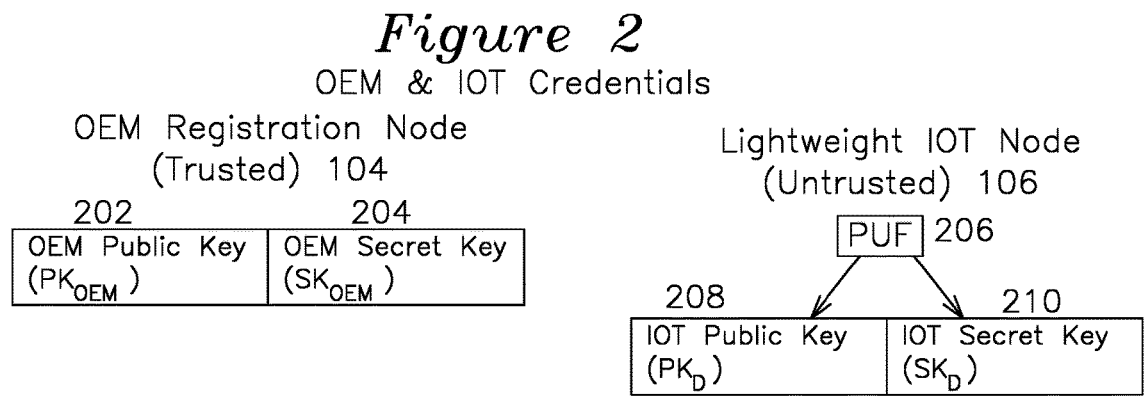
FIG. 2 is a simplified block diagram illustrating components of an OEM registration node and of an untrusted lightweight node, consistent with some embodiments.

Referencing FIG. 2, credentials stored and associated with OEM node 104 and lightweight node 106 are illustrated. OEM node 104 and lightweight node 106 each store respective pairs of public and private keys (e.g. a key pair) associated with public key cryptography, also known as asymmetric cryptography. In particular, OEM node 104 includes an OEM public key 202 and an OEM private key 204 each stored in one or more memories. Consistent with principles of public cryptography the OEM node 104 can provide an OEM public key 202 to other nodes. However, the OEM retains a private key 204 from the other nodes.

Lightweight node 106 includes physical unclonable function 206 which is configured to generate an IoT public key 208 and an IoT private key 210. Again, consistent with principles of public cryptography the lightweight node 106 provides its IoT public key 208 to other nodes. But lightweight node 106 retains an IoT private key 210 from the other nodes.

Figure 3A:
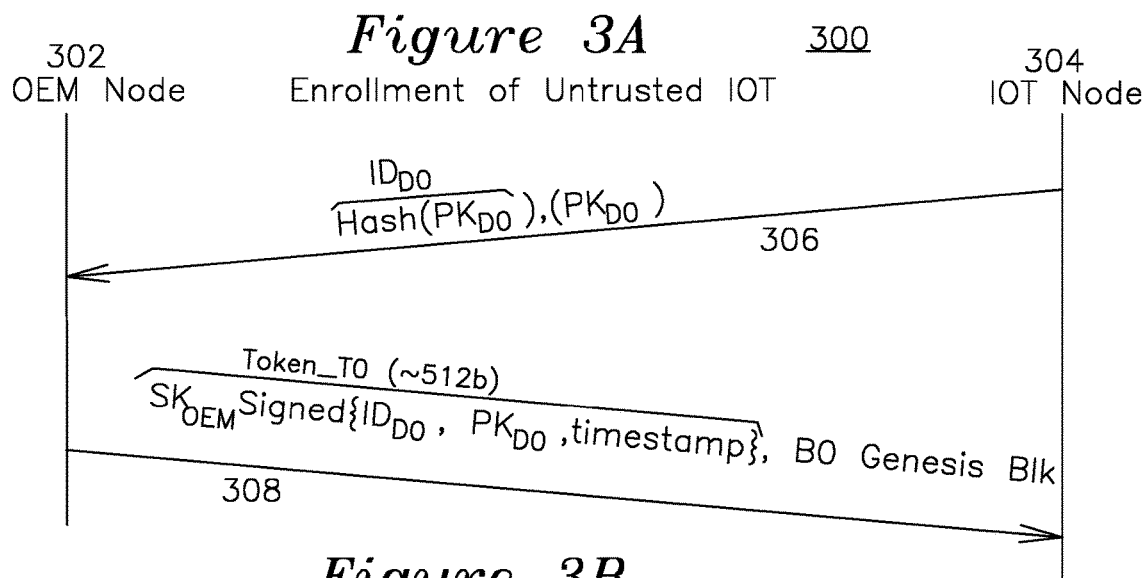
FIG. 3A is a sequence diagram for a first stage of an initial enrollment of a lightweight node in a decentralized network, consistent with some embodiments, showing a short sequence of transmissions between a lightweight node and an OEM node and further showing the lightweight node receiving a token and a B0 genesis block, among other items.

Referencing FIG. 1 and FIG. 3A, a first stage enrollment sequence 300 includes transmissions 306, 308 between an OEM node 302 and an IoT node 304. The IoT node 304 is one exemplary embodiment of a lightweight node.

Enrollment sequence 300 begins with IoT node 304 making a first transmission 306 to OEM node 302. This first transmission 306 includes (1) a public key (i.e. $PK_{D0}$) of the IoT node 304 and (2) and an identifier (i.e. $ID_{D0}$) which is a hash of $PK_{D0}$ of the IoT node 304. In one exemplary embodiment, the hash of the IoT node 304 comprises a NIST SHA-3 function.

Figure 3B:
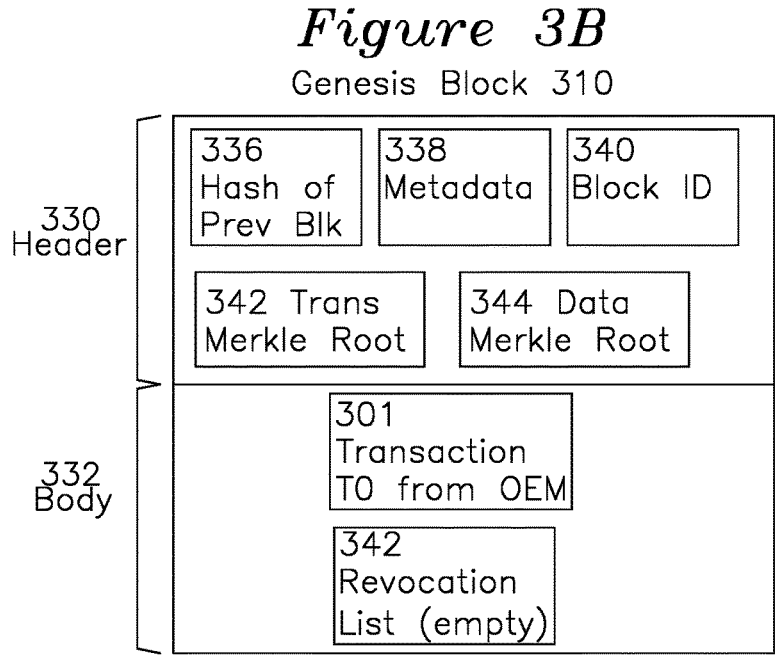
FIG. 3B, is a simplified block diagram of a B0 genesis block, consistent with some embodiments.

As shown in FIGS. 3A and 3B, the OEM node 302 responds with a transmission 308 that includes a token, Token_T0, of approximately 512 bytes, a time stamp, and a genesis block B0. Token_T0 includes at least a signature signed with the OEM node's private key ("$SK_{OEM}$"). Operatively, in the transmission 308 by the OEM node 308, the signature $SK_{OEM}$ is applied to $ID_{D0}$, $PK_{D0}$ and timestamp. The token can be verified by IoT node 304 or by another lightweight node of the network (for example, network 137 of FIG. 1B) with the OEM node's public key. The public key unlocks the signature to obtain $ID_{D0}$ for verifying receipt from the OEM node 302. In one exemplary embodiment, the IoT node 304 also stores Token_T0 for further use.

Each lightweight node of the network receives a token from the OEM node during the first stage of enrollment. Each token in the network is unique because $SK_{OEM}$ signatures are derived from each enrolling node's public key and an identifier that is a hash of that public key. That is, in operation, a token is a certificate in that the token binds an identity of a lightweight node (as represented by its public key and a hash of its public key) with the private key of the OEM node.

Referencing FIG. 3A, the IoT node 304 receives transmission 308 having the "B0" genesis block 310 from the OEM node shown in FIG. 3B. Upon enrolling on the blockchain network, each lightweight node receives the genesis block provided by the OEM node. In contrast to a token, which is unique in the network, all nodes in a network share the same genesis block. The lightweight nodes use the received genesis block 310 as the first block in each of the lightweight node's local blockchains. That is, the received genesis block always becomes the first block for each individual lightweight node registering on the blockchain network where each lightweight node locally appends concatenated blocks to the received genesis block for every consensus thereafter.

Figure 7:
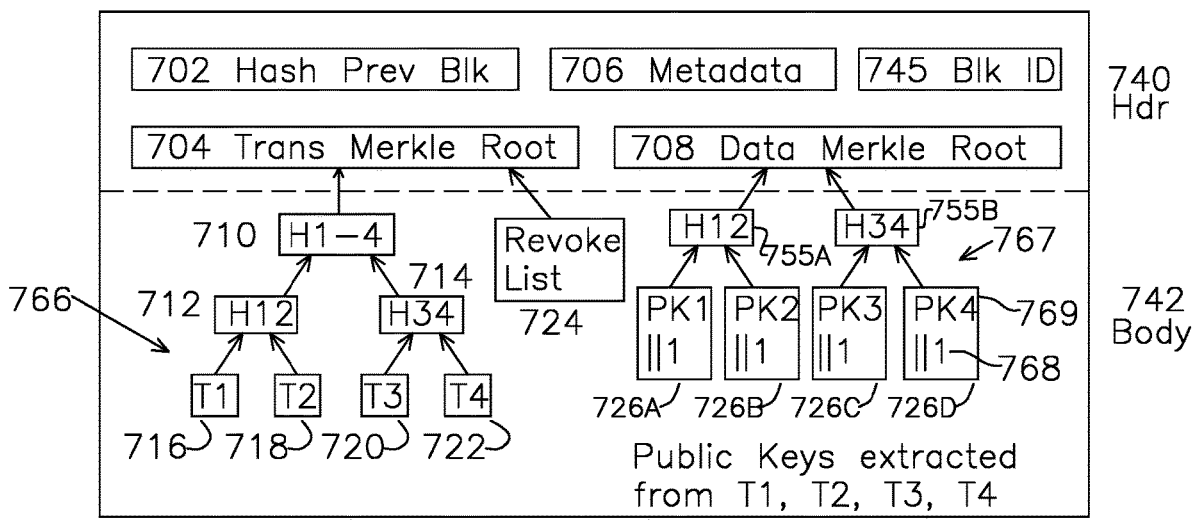
FIG. 7 is a two-dimensional block diagram showing an exemplary structure of a blockchain block, consistent with some embodiments, showing as part of the structure, in the body of the block, the body of a transaction Merkle root tree, the body of a data Merkle root tree, and a revocation list.

In one exemplary embodiment, the genesis block 310 includes a header 330 and a body 352. Header 330 includes a hash of a previous block 336, metadata 338, a block ID 340, a transaction merkle root 342 and a data merkle root 344. These foregoing items are at least similar to and correspond to, respectively, a hash of a previous block 702, metadata 706, a block ID 745, a transaction merkle root 704 and a data merkle root 708, all of FIG. 7. Therefore, the discussion of the hash of a previous block 702, metadata 706, a block ID 745, a transaction merkle root 704 and a data merkle root 708 relative to FIG. 7 is fully applicable. The body 332 of genesis 310 includes a revocation list 324 which is initially empty but otherwise is at least similar to revocation list 724 of FIG. 7. Therefore, the discussion of revocation list 724 relative to FIG. 7 is fully applicable. Body 332 further includes "Transaction T0" which is Transaction T0 401 of FIG. 4 discussed infra.

Referencing FIG. 4, an OEM transaction T0 401 (from OEM) and three transactions T1, T2, and T3 (from IoT nodes) (designated 403A, 403B, 403C) are depicted. Transaction T0 401 includes a header 402, a body 404, and a signature 406 of the body. Header 402 includes a hash of body 404 and signature 406 (e.g. using SHA-3 hash algorithm or other hash algorithm). Those of ordinary skill in the art will readily recognize suitable hash algorithms for the hash body 332 such as among others a NIST SHA-3 hash algorithm. Body 404 includes the public key, such as $PK_{OEM}$, of an OEM node and an identifier $ID_{OEM}$ which is a hash of $PK_{OEM}$. Signature 406 includes a signature signed with the private key, such as $SK_{OEM}$, of an OEM node. The items signed include at least $ID_{OEM}$ and $PK_{OEM}$.

Continuing with reference to FIG. 4, transactions T1, T2, and T3 are associated, respectively, with IoT devices IoT_D1, IoT_D2, and IoT_D3. That is, transactions T1, T2, and T3 correspond to transmissions from IoT devices IoT_D1, IoT_D2, and IoT_D3, respectively, as part of their second stage of enrollment in a network. As noted below, each transaction, T1, T2, T3 includes the tokens received from the OEM node during a first stage of enrollment. On receiving one or more of these transactions, other nodes of this blockchain network of lightweight nodes each locally incorporate these transactions into a block in accordance to predetermined consensus protocols provided by a lightweight consensus algorithm.

Shown in FIG. 4, transactions T1, T2, and T3 each respectively include (1) headers 410A, 410B, 410C, (2) bodies 412A, 412B, 412C, (3) tokens 414A, 414B, 414C of at least part of the respective bodies 412A, 412B, 412C signed with an OEM secret key, such as $SK_{OEM}$, and (4) second signatures 418A, 418B, 418C. By distinction, the first signatures are the tokens, signed with $SK_{OEM}$, applied to bodies 412A, 412B, 412C whereas second signatures 418A, 418B, 418C are at least part of the respective bodies 412A, 412B, 412C signed with an secret key of the corresponding IoT device illustratively shown in FIG. 4 as SKD1 for IoT_D1, SKD2 for IoT_D2, and SKD3 for IoT_D3.

In one exemplary embodiment shown in FIG. 4, M1 refers collectively to Body 412A, token 414A, and second signature 418A of Transaction T1. Similarly, M2 refers collectively to Body 412B, token 414B, and second signature 418B of Transaction T2; and M3 refers collectively to Body 412C, token 414C, and second signature 418C of Transaction T3.

Shown in FIG. 4, headers 410A, 410B, and 410C include, respectively, a hash of M1 420A, a hash of M2 420B, and a hash of M3 420C. Moreover, body 412A includes (1) $ID_{D1}$ which is hash function ($PK_{D1}$) and (2) $PK_{D1}$. Body 412B includes (1) $ID_{D2}$ which is hash function ($PK_{D2}$) and (2) $PK_{D2}$. Body 412C includes (1) $ID_{D3}$ which is hash function ($PK_{D3}$) and (2) $PK_{D3}$.

Turning to the tokens of FIG. 4, token 414A of T1 includes a signature signed with an OEM node's private key ($SK_{OEM}$). The items signed are $PK_{D1}$, $ID_{D1}$ which is a hash of $PK_{D1}$, and a timestamp. Token 414B of T2 includes a signature signed with an OEM node's private key ($SK_{OEM}$). Accordingly, the items signed are $PK_{D2}$, $ID_{D2}$ which is a hash of $PK_{D2}$, and a timestamp. Token 414C of T3 includes a signature signed with an OEM node's private key ($SK_{OEM}$). The items signed are $PK_{D3}$, $ID_{D3}$ which is a hash of $PK_{D3}$, and a timestamp. It should also be said that token 414A of T1 is designated Token_D1, token 414B of T2 is designated Token_D2, and token 414C of T3 is designated Token_D3.

Turning to the second signatures of FIG. 4, second signature 418A of T1 includes a signature signed with the IoT_D1 node's private key, $SK_{D1}$. The items signed are $ID_{D1}$ which is a hash function of $PK_{D1}$, $PK_{D1}$, and Token_D1 414A. Second signature 418B of T2 includes a signature signed with the IoT_D2 node's private key, SKD2. The items signed are $ID_{D2}$ that is a hash of $PK_{D2}$, $PK_{D2}$, and Token_D2 414B. Second signature 418C of T3 includes a signature signed with the IoT_D3 node's private key, SKD3. The items signed are $ID_{D3}$ a hash of $PK_{D3}$, $PK_{D3}$, and Token_D3 414C.

Now with reference to FIG. 5, a process 500 for signature verification is illustrated as follows. In particular, shown in FIG. 5 are process blocks 502, 504 for verification, respectively, of the token 414A and second signature 418A arising from the discussion on FIG. 4 above. On receiving a transmission containing transaction T1, a verifying node, such as among others IoT_D2 and IoT_D3, verifies the signatures as shown in FIG. 5.

In process block 502, verifying node verifies Token_D1 such as among others $SK_{OEM}$ signed {Hash($PK_{D1}$), $PK_{D1}$, and a timestamp)} using the public key of the OEM node, $PK_{OEM}$. That is, because it was signed with $SK_{OEM}$, Token_D1 is verified with $PK_{OEM}$. Recall, as discussed above, each lightweight node receives an OEM node public key on initial receipt of the genesis block. For example, see $PK_{OEM}$ in body 332 of FIG. 3B and in body 404 of FIG. 401.

In process block 504, verifying node uses the public key of IoT_D1, $PK_{D1}$ to verify second signature 418A, such as among others $SK_{D1}$ signed {Hash($PK_{D1}$), $PK_{D1}$, and Token_D1 414A}. That is, because it was signed with $SK_{D1}$, second signature 418A is verified with $PK_{D1}$. $PK_{D1}$ is available to verifying node because it is provided in body 412A of T1.

Figure 6:
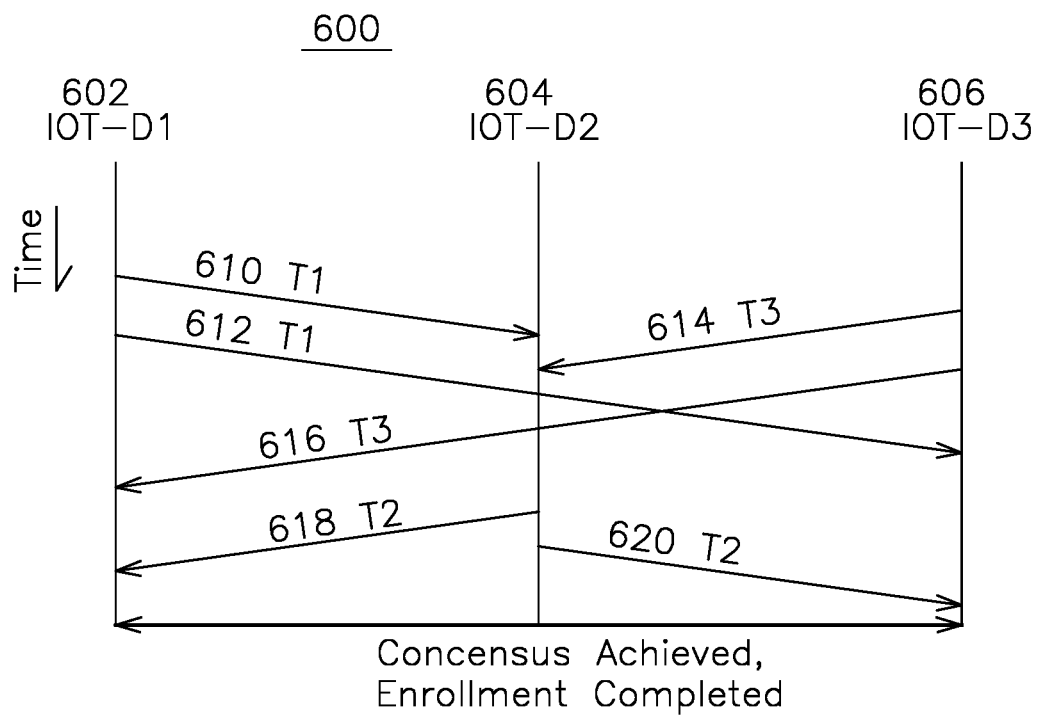
FIG. 6 is a sequence diagram illustrating a sequence of transmissions in a second stage in an enrollment of a plurality of lightweight nodes in the decentralized network.

Referencing FIG. 6, one exemplary sequence 600 of transmissions is depicted among IoT_D1, IoT_D2, and IoT_D3, which in some embodiments are the same IoT nodes discussed relative to FIG. 4. Sequence 600 is an example of a second stage of enrollment, such as among others a one-time registration (OTR), of IoT_D1, IoT_D2, and IoT_D3 in a decentralized network, namely the decentralized network 137 of FIG. 1. Although specific steps in achieving consensus for enrollment are shown, any lightweight consensus algorithm may be used, for example among others, Neurochain.

Referring to sequence 600, IoT_D1 node (602) sends transaction T1, which may be similar to, for example, transaction T1 of FIG. 4, in transmissions 610, 612 to IoT nodes IoT_D2 (604) and IoT_D3 (606), respectively. Transaction T1 may be at least similar to, for example, transaction T1 of FIG. 4. IoT_D3 (606) sends transaction T3 in transmissions 614, 616 to IoT nodes IoT_D2 (604) and IoT_D1 (602), respectively. Transaction T3 may be at least similar to, for example, transaction T3 of FIG. 4. As also shown, IoT_D2 sends transaction T2 in transmissions 618, 620 to IoT nodes IoT_D1 and IoT_D3, respectively. Transaction T2 may be at least similar to, for example, transaction T2 of FIG. 4. Those of ordinary skill in the art will readily recognize further transmissions can occur, in conformance with a lightweight consensus algorithm, until there is a consensus and IoT nodes IoT_D1, IoT_D2, and IoT_D3 are registered in the network.

One alternative embodiment contemplates enrollment of a single IoT node, IoT_D1, and transmissions 610, 612 taking place as described for any of above embodiments. In this alternative embodiment, in accordance with a lightweight consensus algorithm, one of IoT devices, for example IoT_D2, is a miner that incorporates transaction T1 into a block (Bi) other than the genesis block, Bo. Thereafter, the miner IoT_D2 then broadcasts Bi across the decentralized network including IoT_D3 node. Accordingly, the receiving IoT devices then use the lightweight consensus algorithm to verify and accept the new block, Bi. When block Bi is unanimously accepted by the decentralized network of IoT nodes, then consensus has been achieved and at least IoT node IoT_D1 is considered enrolled in the network. That is, one-time registration (OTR) of IoT_D1 is achieved.

As discussed above, those of ordinary skill in the art will readily recognize use of any lightweight consensus algorithm, including, for example, Neurochain. Some attributes of a lightweight consensus algorithm include (1) a designation of at least one of the IoT nodes as a miner, (2) a process for a miner to create and broadcast a block, (3) a process of verification and acceptance of the block by other IoT nodes, (4) security measures to protect the process of reaching consensus from attack or tampering.

Referencing FIG. 7, an exemplary block structure for a block 700 in a lightweight blockchain is shown. The block 700 includes a header 740 and a body 742. The header 740 includes at least four fields having at least previous block hash 702, a transaction Merkle root 704, a data Merkle root 708, and metadata 706. The body 742 includes at least a portion of a transaction Merkle tree 766, a revocation list 724, at least a portion of a data Merkle tree 767 and an ordered set of transactions.

Starting with the body 742, a transaction Merkle tree 766 includes transaction hashes comprising leaf nodes, for example transaction hashes T1-T4 shown in FIG. 7 as 716, 718, 720, and 722 respectively. In one exemplary embodiment, these transaction hashes 716, 718, 720, 722 are created in accordance with a lightweight consensus algorithm for a device enrollment. The interior nodes H12 712, H34 714 each include two child nodes, leaf nodes 716-718, and 720-722, respectively. These interior nodes 712, 714 each contain a corresponding hash computed from the two corresponding child nodes. In FIG. 7, moving higher up transaction Merkle tree 766, node 710 is a hash derived from interior nodes 712 and 714.

A revocation list 724 contains information regarding public keys that have been revoked. In some embodiments, the decentralized network 137 of FIG. 1B utilizes public keys associated with its lightweight nodes, such as IoT nodes, as an identifier. A lightweight node whose public key appears in the revocation list 724 fails to authenticate on the network.

In one exemplary embodiment, the data Merkle tree 767 includes leaf 726A-726D that include hashes of: (a) public keys PK1, PK2, PK3, and PK4 associated the transactions, and (b) a validity value 768 for associated public keys indicating the status of the associated public keys, such as values for a status bit as shown in 726A-726D, for example 1 for valid and 0 for revoked. In an embodiment, each public key such as 769 is concatenated with a validity value before being hashed. As referenced above, transactions include a public key such that the public keys can be obtained for purposes of building a data Merkle root tree 767. Shown in FIG. 7, intermediate hashes 755A, 755B comprise intermediate nodes where each intermediate node are corresponding hashes of their two respective child nodes 726A-726B and 726C-726.

Further reference is made to FIG. 7 to discuss the header 740.

The previous block hash 702 is a hash of a block that will be the previous block when block 700 is thus added by concatenation to a blockchain to thereby serve as an identifier for the previous block.

The transaction Merkle root 704 is a hash of both the top node 710, node H1-4, of transaction Merkle tree 766 and the revocation list 724.

The data Merkle root 708 is the top node of data Merkle root tree 767. In the example shown, the data Merkle root 708 is a hash of two intermediate hashes H12 755A, H34 755B. Accordingly, referring to the leaf nodes 726A-726D, a data Merkle root 708 is computed by first computing intermediate hashes 755A, 755B which in this example are hashes of two leaf nodes. That is, intermediate hash H12 755A is computed by hashing the two leaf nodes 726A and 726B that correspond to H12 755A. Similarly, intermediate hash H34 755B is computed as a hash of its two leaf nodes 726C and 726D. The data Merkle root 708 is then computed as the hash of intermediate nodes H12 755A and H34 755B.

However, it is not necessary to have all of the nodes of a data Merkle root tree 767 to verify the data Merkle root 708. Instead a data Merkle root 708 may be recomputed with just selected intermediate hashes. In the example shown in FIG. 7, if one knows leaf nodes 726A, 726B, and intermediate hash H34 755B, the two leaf nodes 726A, 726B are used to compute intermediate hash H12 755A. Intermediate hash H12 755A is used with intermediate hash H34 755B to verify data Merkle root 708.

The metadata 706 includes miscellaneous data, such as, for example, a time stamp.

When it is enrolled in the network, a lightweight node saves two data elements, called a key, for the block containing the enrollment transaction for that node, for example transaction 403A of FIG. 4. First, the key includes a block identifier 745 having a block hash, block number, or hash of block number for the block in which enrolled. Second the key includes one or more intermediate hashes 755A, 755B necessary to recompute the data Merkle root 708 for the block. In the example shown, an enrolling light weight node whose public key is associated with leaf node 726A stores a block identifier for block 700, illustrated as block number B1 745 and in addition leaf node 726B and intermediate hash H34 755B. These two data elements are stored in local memory of each lightweight node, as opposed to storing in the blocks, commonly referred to as storing "on-chain", for later authentication operations.

Figure 8:
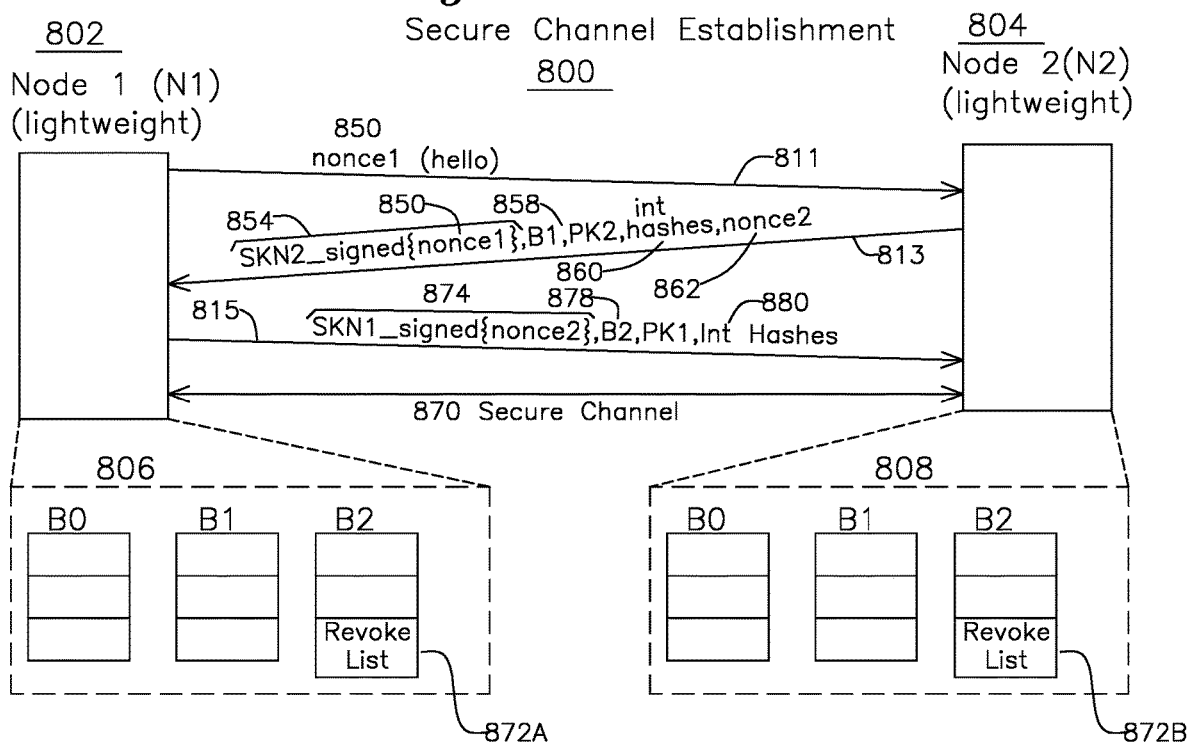
FIG. 8 is a sequence diagram illustrating a process of creating a secure connection between two lightweight nodes of a decentralized network and also showing exemplary blockchains stored in memory of the two lightweight nodes, consistent with some embodiments.

FIG. 8 illustrates one exemplary authentication sequence 800. The authentication sequence authenticates a first lightweight node 802 (node 1) and a second lightweight node 804 (node 2) to one another. Is this example, the authentication sequence 800 is implemented between two lightweight nodes 802, 804 for purposes of establishing an encrypted channel 870 for secured communication.

Authentication sequence 800 begins with a first transmission 811. The first lightweight node 802 sends the first transmission 811 that transmits a message including at least one random challenge 850. In one exemplary embodiment, the at least one random challenge 850 comprises a nonce, shown as nonce 1.

Authentication sequence 800 continues with a second transmission 813 by the second lightweight node 804. The second lightweight node 804 transmits a message that includes at least: (1) a signature 854 consisting of nonce 1 signed by a private key SK2 of the second lightweight node 804; (2) the corresponding public key PK2 of the second lightweight node 804; (3) a block identifier B1 858 corresponding to a block B1 in which the second lightweight node 804 became enrolled in the decentralized network; (4) one or more intermediate hashes 860 associated with the block identifier B1 858 and the second lightweight node 804; and (5) a random challenge 862 illustrated as nonce 2 in FIG. 8.

On receiving transmission 813, the first lightweight node 802 performs at least the following operations for authentication of second lightweight node 804.

a. Verifying validity of public key PK2 of second lightweight node 804 as a valid public key on the decentralized network 137. This verification includes accessing block B1 having a structure shown in block 700 and associated with the received block identifier B1 858 from its stored blockchain 806 for example a blockchain containing at least blocks B0, B1, B2. Extracting a first data Merkle root, such as for example, Merkle 708 from header 740 of FIG. 7 of block B1. Computing a second data Merkle root with the intermediate hashes 860. Comparing the first and the second data Merkle roots and determining if the first and second Merkle roots match one another where such a match at least partly verifies that the public key of the second lightweight node 31 is validly enrolled on the decentralized network. Further, to describe use of a revocation list for further verification of the public key, this discussion continues below after setting forth FIGS. 11A-11C.

b. Verifying that the public key PK2 belongs to the second lightweight node 804 by using the received public key PK2 of the second lightweight node 804 to attempt verification of the signature 854 (of nonce 1) created with the private key (SK2) of the second lightweight node 804. Verification succeeds if application of PK2 to signature 854 yields 1. If verification succeeds, the public key belongs to the second lightweight node 32. Second lightweight node 804 is then authenticated to first lightweight node 802.

Assuming authentication of the second lightweight node 804 succeeds, then lightweight node 802 must be authenticated to lightweight node 804. Thus, authentication sequence 800 of FIG. 8 continues with a third transmission 815 by the first lightweight node 802 that includes transmitting a message having at least: (1) a signature 874 that consists of nonce 2 signed by a private key, SK1, of the first lightweight node 802; (2) the corresponding public key PK1 of the first lightweight node 802; (3) a block identifier B2 878 corresponding to block B2 in which the first lightweight node 802 became enrolled on the decentralized network; and (4) one or more intermediate hashes 880 associated with both the block identifier B2 878 and the first lightweight node 802.

On receiving transmission 815, the second lightweight node 804 performs at least the following operations.

a. Verifying validity of public key PK1 of first lightweight node 802 by accessing block B2 having a structure shown in block 700 and associated with the received block identifier B2 878 from its stored blockchain 808, with blocks B0 B1, and B2. Extracting a first data Merkle root, illustratively shown as data Merkle root 708. With the intermediate hash compute a second data Merkle root. Comparing the two data Merkle roots and determining if the two data Merkle roots match one another where such a match at least partly verifies that the public key PK1 of the first lightweight node 802 is validly enrolled on the decentralized network 137. Further, to describe use of a revocation list for further verification of the public key, this discussion continues below after setting forth FIGS. 11A-11C.

b. Verifying that the public key PK1 belongs to the first lightweight node 802. Given the received public key PK1, successful verification is partially contingent the public key PK1 belonging to the first lightweight node 802. Successful verification is also contingent if application of public key PK1 to signature 874 yields 1, where the signature 874 was initially created with the private key SK1 of the first lightweight node 802.

If authentication of the first lightweight node 802 succeeds, then authentication of both lightweight nodes 802, 804 has succeeded and authentication sequence 800 continues with the establishment of a secure (e.g. encrypted) channel 870 between the two lightweight nodes 802, 804.

Figure 9:
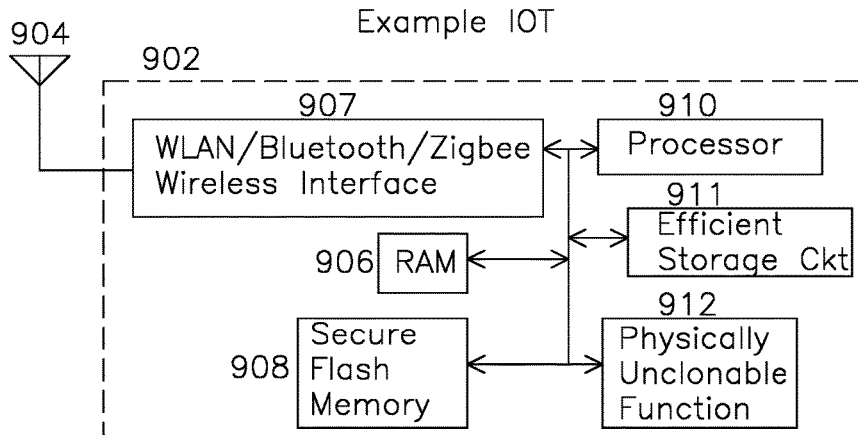
FIG. 9 is a block diagram illustrating exemplary circuitry of a given lightweight node, consistent with some embodiments.

For the embodiment of FIG. 9 a lightweight node 902 comprises an IoT device which includes an antenna 904 for communication with an OEM node or another lightweight node. Lightweight node 902 further includes a WLAN (wide area network)/Bluetooth/Zigbee wireless interface 907 communicably coupled with the antenna 904. Examples of a wireless network interface include among others a WLAN (wide area network), Bluetooth, and Zigbee interface.

Lightweight node 902 further includes a processor 910 communicably coupled with the wireless interface 907 for sending and receiving transmissions via antenna 904. Processor 910 is communicably coupled to at least one memory device, such as a secure flash memory 908 and a random access memory (RAM), provided by the lightweight node 902. The processor 910 is operative to execute the operations or to store the data structures shown in FIGS. 1-4. The secure flash memory 908 stores data, such as intermediate hashes, block numbers, and tokens, and executable code for use by processor 910. In one exemplary embodiment, the secure flash memory 908 stores a public key that is accessible by the processor 910. In operation, such as in the authentication sequence 800 of FIG. 8, the public keys are transmitted from the lightweight node 902 to other lightweight nodes. Secure flash memory 908 may further store a private key which is not publicly accessible.

Lightweight node 902 also includes a physically unclonable function (PUF) 912 which is configured for generating key pairs of public and private keys. These are well known in the art and refer to a device that utilizes the randomness in a physical object for various purposes, such as the generation of cryptographic keys. The details of physical unclonable function 912 are not further described. In one exemplary embodiment, the lightweight node 902 further includes efficient storage circuit 911 (ESC), which may be configured to work as a controller and cache between processor 910 and secure flash memory 908. In particular, ESC 911 may be configured with logic for efficiently storing a block.

Various embodiments are now discussed. Embodiments related to enrolling an unenrolled lightweight node in a decentralized network are discussed first. Within that discussion, the first-discussed embodiments are described from the point of view of an unenrolled lightweight node.

In some embodiments an unenrolled lightweight node, such as for example node 106, is configured for seeking enrollment in a decentralized network (e.g. network 137). The decentralized network has at least a trusted node, such as for example OEM node 104, and also has a plurality of peers that include at least one enrolled lightweight node and the unenrolled lightweight node. The plurality of peers are configured to execute a lightweight blockchain consensus algorithm.

In some embodiments, the unenrolled lightweight node includes at least memory 908 for storing a token, such as for example token_T0 of FIG. 3A. The token includes a signature having at least a signature of at least a first identifier signed with a private key of the trusted node. The first identifier being associated with at least a public key of the unenrolled lightweight node. In some embodiments the first identifier is a hash of the public key of the unenrolled lightweight node.

For example, referencing FIG. 3A, consistent with some embodiments the unenrolled lightweight node received the token as part of a first stage of becoming enrolled in the decentralized network. In some further embodiments the unenrolled lightweight node previously received the token, for example token_T0, in a transaction at least similar to transaction 308 from a trusted node, such as for example OEM node 302. In some further embodiments the first identifier is a hash of a public key of the unenrolled lightweight node, such as for example $ID_{D0}$ of FIG. 3A. The signature is on the first identifier signed with the private key of the trusted node, for example $SK_{OEM}$ of OEM node. Then after receiving the token, the unenrolled lightweight node is configured to store the token in memory, such as for example memory 908.

In some further embodiments the unenrolled lightweight node further includes at least circuitry for broadcasting, such as for example the antenna 904 and the wireless interface 907, a request for blockchain enrollment of the unenrolled lightweight node to the plurality of peers having at least one enrolled lightweight node. The authentication request includes at least a second identifier that is associated with at least a public key of the unenrolled lightweight node, a signature created with at least the second identifier and a corresponding private key of the unenrolled lightweight node, and the token.

For example, in some embodiments, the authentication request is part of a second stage of enrollment in a decentralized network. And in some further embodiments, the request is a transaction, such as for example, transaction T1 (403A) of FIG. 4. In these embodiments, the second identifier is at least similar or analogous to $ID_{D1}$, which has been described above relative to FIG. 4. The token is, for example, at least similar or analogous to Token_D1 (414A), which has been described above relative to FIG. 4. And the signature is at least similar or analogous to first signature 418A, that has been described above relative to FIG. 4.

In some embodiments, the first identifier includes at least a hash of the public key of the unenrolled lightweight node, such as for example $ID_{D1}$ (which is Hash($PK_{D1}$) of FIG. 4.

In some embodiments the second identifier also includes at least a hash of the public key of the unenrolled lightweight node, such as for example $ID_{D1}$ (which is Hash($PK_{D1}$) of FIG. 4.

In some embodiments the hashes of the public key of the unenrolled lightweight node were created with a NIST SHA-3 hash algorithm.

In some embodiments, the signature with the private key of the trusted node was created with the first identifier, the public key of the unenrolled lightweight node, and a timestamp being signed with the private key of the trusted node. For example, to create Token_D1 (414A) of FIG. 4, $SK_{OEM}$, the private key of the OEM node, is used to sign (1) a hash of the public key of an IoT device, (2) the public key itself, and a timestamp.

In some embodiments, the signature with the private key of the unenrolled lightweight node was created with the second identifier, the token, and the public key of the unenrolled lightweight node being signed with the private key of the unenrolled lightweight node. For example, in FIG. 4 the second signature 418A is created with the private key of the IOT-D1 ($SK_{D1}$) being used to sign (1) a hash of the public key of the IoT device ($ID_{D1}$), (2) the public key of the IoT device ($PK_{D1}$), and (3) the Token (Token_D1 414A).

In some embodiments, the request further includes the public key of the unenrolled lightweight node. As noted above, in some embodiments, the request is a transaction, such as for example transaction T1 (403A). The body 412A of transaction T1 includes the public key ($PK_{D1}$) of the IoT node IoT_D1, and the hash of $PK_{D1}$.

In some embodiments the unenrolled lightweight node further including circuitry, such as for example antenna 904 and interface 907, for receiving from at least one peer of the decentralized network a block, such as for example block 700, for verification and inclusion in a blockchain, the block including at least a transaction, such as for example transaction T1 (403A), for enrollment of the unenrolled lightweight node. That is, the block contains a transaction for enrollment of the unenrolled lightweight node.

In some further embodiments, the unenrolled lightweight node further includes circuitry for utilizing a lightweight consensus algorithm to reach a consensus with the plurality of peers of the decentralized network. Thus, in some embodiments, the block containing the transaction for enrollment of the unenrolled lightweight node is processed by the plurality of peers using a lightweight consensus algorithm. In operation, the lightweight consensus algorithm provides protocols for all lightweight nodes on the decentralized network for arriving at a consensus to approving the concatenated addition of a new block to the blockchain or to reject the block for inclusion to the blockchain shared by all lightweight nodes on the decentralized network.

In yet some further embodiments the unenrolled lightweight node further includes circuitry for adding the block to a blockchain responsive to a consensus to add the block to the blockchain, wherein the unenrolled lightweight node thereupon becomes enrolled on the decentralized network. That is, if there is a consensus to accept the block, the unenrolled node becomes enrolled upon completion of the consensus. For example, referencing FIG. 13A, the one-time registration phase 1302, which is the second stage of enrollment in the network, begins with transmitting a transaction via transmission process 1306 to a consensus process, continues with transmitting of a block containing the transaction to nodes in the network (including to Device_A 1320 and to OEM node 1322) for verifications 1308A, 1308B of the block, and ends with successful storing 1310A, 1310B of the verified block, for example in the local blockchains of the nodes of the decentralized network.

In yet some further embodiments the unenrolled lightweight node further including circuitry configured for, upon successful addition of the block to the local blockchains, storing a block identifier (e.g. a block number, a hash of a block number, a block hash, etc.) of the block and an intermediate Merkle tree hash associated with the block in memory of the now enrolled lightweight node. The circuitry includes at least memory 908.

In some embodiments, the unenrolled lightweight node further includes circuitry, such as for example antenna 904 and interface 907, for receiving the token from the trusted node. For example, referencing FIG. 13A, in enrollment phase 1301, the first phase for enrollment of a lightweight node in the decentralized network, a node, such as Device_A, receives a token from an OEM node 1322 via transmission 1305. Similarly, referencing FIG. 3A, IoT node 304 receives a token from OEM node 302 via transmission 308 as part of enrollment.

The discussion of embodiments related to enrolling an unenrolled lightweight node in a decentralized network continues. Within that discussion, the discussion now turns to description of embodiments from the point of view of an enrolled lightweight node rather than from the point of view of the unenrolled lightweight node.

First described is a one-time registration (OTR) phase 1302. The OTR phase is discussed above relative to FIG. 13A. In some embodiments it begins with the plurality of peers of a decentralized network receiving a transaction, such as for example a transaction similar or analogous to transaction T1 of FIG. 4, broadcast from an unenrolled lightweight node. Again, the below is from the perspective of an enrolled lightweight node receiving this broadcast.

In some embodiments, there is an enrolled lightweight node on a decentralized network. The decentralized network further includes at least one unenrolled lightweight node and at least one trusted node, such as for example OEM node 104.

The enrolled lightweight node includes at least circuitry, such as for example antenna 904 and interface 907, for receiving from the unenrolled lightweight node an enrollment request, such as for example transaction T1 of FIG. 4. The enrollment request includes at least (a) a token (such as for example Token_D1 (414A) of FIG. 4) that includes a signature that includes at least a signature of a first identifier (such as for example $ID_{D1}$ of FIG. 4, which is a hash of a public key of a node) signed with a private key of the trusted node (such as for example the private key of OEM node), the first identifier being associated with a public key of the unenrolled lightweight node (for example, in some embodiments the first identifier may be a hash of the public key of the unenrolled lightweight node) and (b) a second identifier (such as for example $ID_{D1}$ of FIG. 4, which is a hash of a public key of a node) that is associated with at least a public key of the unenrolled lightweight node and a second signature (such as for example second signature 418A of FIG. 4) created with at least the second identifier and a corresponding private key of the unenrolled lightweight node (for example, in some embodiments the second signature was created with the second identifier, the token, and the public key of the unenrolled lightweight node being signed with the private key of the unenrolled lightweight node).

In some embodiments, the above-described enrollment request is a transaction, such as a transaction similar or analogous to transaction T1 of FIG. 4. In these embodiments the token discussed above is a token similar or analogous to Token_D1 (414A), the second identifier discussed above is an identifier similar or analogous to $ID_{D1}$ of FIG. 4, which is a hash of a public key associated with a lightweight node, and the second signature is a signature at least similar or analogous to second signature 418A of FIG. 4.

And the enrolled lightweight node further includes at least circuitry, upon receipt of the enrollment request, for broadcasting the enrollment request to at least one other enrolled lightweight node of the decentralized network, such as for example decentralized network 137. The circuitry includes at least such as for example antenna 904 and interface 907.

In some embodiments, the enrolled lightweight node further includes circuitry for authenticating the first signature at least in part with the public key of the trusted node. Illustratively, in one embodiment, the processor 910 gives the hash of public key and the signature to a verification algorithm that returns match/not match. In these embodiments the enrolled lightweight node further includes circuitry for authenticating the second signature at least in part with the public key of the unenrolled node. Illustratively, in one embodiment, the processor 910 gives the hash of public key and the signature to a verification algorithm that returns match/not match. The above discussion relative to FIG. 5 is applicable to the above. In some embodiments a signature signed with a private key of a node may be verified with the corresponding public key of that node.

In some further embodiments, the enrolled lightweight node further includes (1) circuitry for creating a block that includes at least the enrollment request, responsive to successful authentication of the first and second signatures, and (2) circuitry for utilizing the lightweight blockchain consensus algorithm for reaching consensus regarding whether to accept or reject the block. That is, as part of the second stage of enrollment of a lightweight node in the network, also called a one-time registration phase, a block is created that includes a transaction for enrolling the unenrolled lightweight node. This block is then submitted to a lightweight consensus algorithm to determine if the block is to be added to each node's local copy of a blockchain. Thus, in some embodiments, the block containing the transaction for enrollment of the unenrolled lightweight node is processed by the plurality of peers using a lightweight consensus algorithm. In operation, the lightweight consensus algorithm provides protocols for all lightweight nodes on the decentralized network for arriving at a consensus to approving the concatenated addition of a new block to the blockchain or to reject the block for inclusion to the blockchain shared by all lightweight nodes on the decentralized network. Further details are described below with reference to FIG. 13A and the description of the OTR phase 1302.

In yet some further embodiments, the enrolled lightweight node 1320 further includes circuitry for adding the block to a block chain responsive to a consensus to add the block to the blockchain, wherein the unenrolled lightweight node thereupon becomes enrolled. That is, if there is a consensus to accept the block, the unenrolled node becomes enrolled upon completion of the consensus. For example, referencing FIG. 13A, the one-time registration phase 1302, which is the second stage of enrollment in the network, begins with transmitting a transaction via transmission process 1306 to a consensus process, continues with transmitting of a block containing the transaction to nodes in the network (including to Device_A 1320 and to OEM node 1322) for verifications 1308A, 1308B of the block, and ends with successful storing 1310A, 1310B of the verified block, for example in the local blockchains of the nodes of the decentralized network.

In some embodiments, the at least one enrolled node is configured to store at least a lightweight blockchain with at least one block, such as for example block 700, with a block header that includes a data Merkle root (e.g. data Merkle root 708) computed at least in part from a least one Merkle tree node (e.g. 726A) containing a hash value computed directly or indirectly from a combination of a public key and a validity value for the public key. That is, in some embodiments a block header for a block includes a data Merkle root, which is the root of a Merkle tree whose nodes include hashes of public keys concatenated with a validity value, such as for example "1" for valid and "0" for invalid. Data Merkle tree roots and data Merkle trees are described in further detail relative to FIGS. 7 and 11A.

Discussion now turns to embodiments relating to authentication of lightweight nodes of the decentralized network to each other. In some embodiments this authentication is for the purpose of establishing a secure channel of communication between the lightweight nodes. In some embodiments, authentication uses data structures provided to lightweight nodes in the enrollment processes described above. For more details regarding method embodiments described below, the reader may refer to the sequence diagram of FIG. 8 and related discussions. The below method embodiments are described from the point of view of a first lightweight node performing one or more authentication processes with a second lightweight node.

In some embodiments, a first lightweight node performs a method of establishing a secure connection on a decentralized network, such as for example network 137, between the first lightweight node and a second lightweight node of the decentralized network, the method performed with the first lightweight node. In some embodiments the first and second lightweight nodes are Node 1 and Node 2, respectively, of FIG. 8.

The method includes at least with the first lightweight node transmitting a first nonce to the second lightweight node. In some embodiments, the above transmission is transmission 811 of FIG. 8. Nonce 1 is an example of a random challenge sent as part of an authentication process.

The method continues with the first lightweight node receiving from the second node at least (1) a signature created with at least a private key of the second lightweight node and the first nonce, (2) a public key of the second lightweight node, (3) a block identifier corresponding to a block in a blockchain in which the second lightweight node was registered (4) one or more first intermediate Merkle tree hashes associated with the block, and (5) a second nonce. Thus, the second lightweight node responds to nonce1 by transmitting the first lightweight data elements that the first lightweight node uses (below) to authenticate the second lightweight node. In some embodiments, the above transmission is transmission 813 of FIG. 8.

In some embodiments, the method further includes the first lightweight node engaging in actions to authenticate the second lightweight node with the data items received above. These actions include at least:

(1) accessing a copy of a blockchain stored in the first lightweight node, (2) locating a block in the copy of the blockchain that corresponds to the block identifier, (3) accessing a first Merkle root associated with the located block; (4) with at least the public key of the second lightweight node and the received one or more intermediate hashes, computing a second Merkle root, (5) determining if the first and second Merkle roots match, (6) and if the first and second Merkle roots match determine that the public key is registered in the decentralized network. Thus, a first data Merkle root is obtained from a block in which the second lightweight node was registered and a second data Merkle root is computed with the public key and the intermediate hashes. If they match, the public key is determined to be registered in the network. However, this still leaves undetermined whether the public key belongs to the second lightweight node. For that, in some embodiments, an additional action is performed. More details are provided in an above discussion relative to transmission 813 of FIG. 8.

In some embodiments, the method further includes at least with the public key verifying the signature, and upon verification of the signature, determining that the public key is validly associated with the second lightweight node and that the second lightweight node is an authentic node on the decentralized network. As discussed above, the signature was created with at least a private key of the second lightweight node and the first nonce. That is, the private key of the second lightweight node was used to sign the first nonce. In some embodiments this signature may be verified with the public key of the second lightweight node, which was provided to the first lightweight node above. Upon successful verification, the first lightweight node determines that the second lightweight node is authenticated.

In some embodiments, the method further includes transmitting (e.g. transmission 815) to the second lightweight node at least (1) a signature created with at least a private key of the first lightweight node and the second nonce, (2) a public key of the first lightweight node, (3) a block identifier corresponding to a block in a blockchain in which the first lightweight node was registered (4) and one or more second intermediate Merkle tree hashes associated with the block and the first lightweight node. Thus, the first lightweight node responds to the authentication of the second lightweight node by transmitting to the second lightweight node data elements that the second lightweight node uses to authenticate the first lightweight node. In some embodiments, the above transmission is transmission 815 of FIG. 8.

In some embodiments, the method further includes at least responsive to the first lightweight node being authenticated by the second lightweight node, establishing a secure channel with the second lightweight node. That is, once both the first and the second lightweight nodes have been authenticated to each other, a secure channel for communication is established.

Part Two

A possible design consideration for some embodiments is to provide a functioning decentralized network of lightweight nodes that contain less than a full copy of the transaction history of the blockchain in memory as does a full node on the blockchain network.

Another possible design consideration for some embodiments is to provide a data Merkle root that by itself is insufficient for re-creating a data Merkle root tree, but which, together with a public key and an intermediate hash, is sufficient for use in authentication processes in the blockchain network.

Another possible design consideration for some embodiments is to provide a revocation list that indicates public keys registered on the network that have been revoked.

Another possible design consideration for some embodiments is to provide for updating of intermediate hashes and data Merkle roots in response to a revocation of a public key that is associated with a lightweight node on a network.

Please note that not all possible design considerations are applicable to all embodiments. A brief overview if provided before describing embodiments with reference to the figures.

In some embodiments, lightweight nodes in a decentralized network store an abridged transaction history on concatenated blocks of a blockchain having a header and a body that is either empty or that contains a revocation list as opposed to a full transaction history like a full node stores. In one embodiment, the revocation list contains data regarding public keys that have been revoked.

Because in some embodiments the revocation list is stored only in the last block, many block bodies in a lightweight blockchain are empty. Alternative embodiments include a block body having a block header having both a transaction Merkle root and a data Merkle root. Because it is a root derived from a transaction Merkle tree, the transaction Merkle root itself is insufficient to recreate an entire Merkle tree. In one exemplary embodiment, the transaction Merkle tree includes at least one Merkle tree having transaction data. Similarly, because it is a root derived from a data Merkle tree, the data Merkle root itself is insufficient to recreate an entire data Merkle tree. In one exemplary embodiment, the data Merkle tree includes at least a Merkle tree bearing data related to public keys that each correspond with a lightweight node of the network. Further detail regarding data Merkle trees is provided below.

In some embodiments, when a public key is enrolled in the network, the corresponding lightweight node is thereby enrolled. Contrastingly, when a public key is revoked, the corresponding lightweight node's enrollment is thereby revoked.

By including enrollment transactions with the transaction history stored on each concatenated block of the blockchain via the lightweight consensus algorithm, devices are either enrolled or revoked from access to the decentralized network. In some embodiments, when a lightweight node is enrolled in the decentralized network via a block, it first verifies the block then stores the block identifier and all the intermediate hashes needed to recompute a data Merkle root associated with the block. Examples of block identifiers include among others a block number and a block hash.

The lightweight node then deletes everything in the body of the block except a revocation list. When a public key is revoked then the data Merkle root—of the block in which the public key was enrolled—is updated by adding the revoked public key concatenated with a null or 0. Although a '1' may be used to indicate validity and a '0' may be used to indicate invalidity or revocation, those of ordinary skill in the art will recognize other validity indicators that may be used.

At the time of registration of public key 'A' which was enrolled in block 'B', the updated data Merkle root for block B will be used thereafter in authentication processes for lightweight nodes.

In some embodiments, a revocation list includes an entry for a block only if at least one public key which was enrolled in that block has been revoked. If a block has an entry in the revocation list, then the data Merkle root for that block is available in the revocation list. Otherwise the data Merkle root has to be obtained from the block itself.

As noted above, when a block that contains an enrollment transaction for a public key verified and added to the blockchain then the public key is thereby enrolled on the network. In some embodiments, once its public key is enrolled in the network, a corresponding lightweight node will store in memory a block identifier for the block and intermediate hashes that together with its public key are sufficient to recompute the data Merkle root. The memory storage space needed to store a block identifier (if a block number) and the associated intermediate grows at a magnitude of log(n), where n is the number of public keys enrolled in a block.

After storing the block identifier and the intermediate hashes, in some embodiments the enrolling lightweight node drops everything from its body. In some embodiments, the last block in the blockchain retains the revocation list in its body. In other embodiments, at least some additional transaction data is retained in the body.

In some embodiments, a revocation list optimized to minimize its storage space requirements and to aid searching the revocation list. In some exemplary revocation lists provide an entry only for each block in which a public key was registered that has since been revoked. A block in which public keys were enrolled, none of which is since revoked, does not have an entry in the revocation list. Each entry in the revocation list corresponds to a single block, and an entry for that block will contain the following three fields: (1) a block identifier identifying the block, (2) a set of revoked public keys that were enrolled (e.g. registered) in the block, and (3) updated data Merkle root. The information present in the revocation list is supplied by an OEM node (e.g. OEM node 104 of FIG. 1). It is noted that in some embodiments, a revocation list has an entry for each block in a blockchain.

Figure 10:
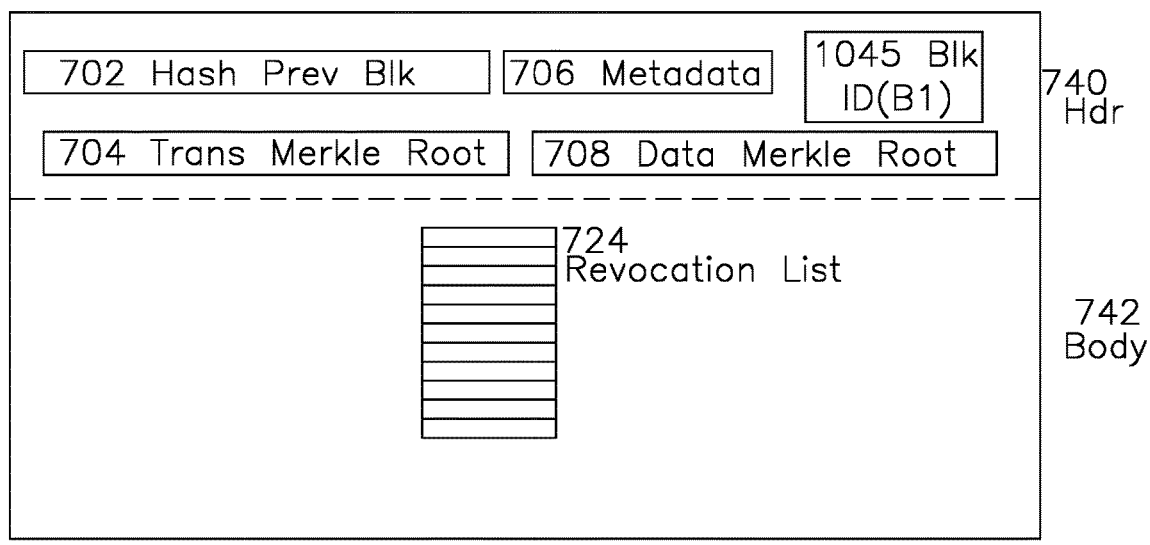
FIG. 10 is a two-dimensional block diagram showing an exemplary structure of a blockchain block, consistent with some embodiments, showing a body that includes only a revocation list.

Referencing FIG. 10 a block 1000 has a block body 742 that is empty except for a revocation list. That is, block 1000 is an optimized block where all data except for the revocation list 724 has been dropped from body 742. In some embodiments block 1000 is the same block as block 700 of FIG. 7, except at a later point in time when the transaction Merkle tree 766 and the portion of the data Merkle tree 767 have been dropped from body 742 as an optimization to reduce memory storage requirements. Block 1000 is, in some embodiments, a last block of a blockchain because the revocation list 724 is stored only in the last block. In these embodiments, if block 1000 were not the last block of a blockchain, then block body 742 would be empty. The block header 740 is unchanged from FIG. 7 and contains a previous block hash 702, the transaction Merkle root 704, the data Merkle root 708, and the metadata 706. Block 1000 has a block identifier B1 1045.

In some embodiments, a difference between block 700 of FIG. 7 and block 1000 of FIG. 10 is timing. That is, block 700 arises after mining but before the block is verified and added to the blockchain. Once the block is verified and added to the block chain, then the transaction Merkle tree 766, data Merkle tree 767, and the transactions are dropped from storage on the block body.

Figure 11A:
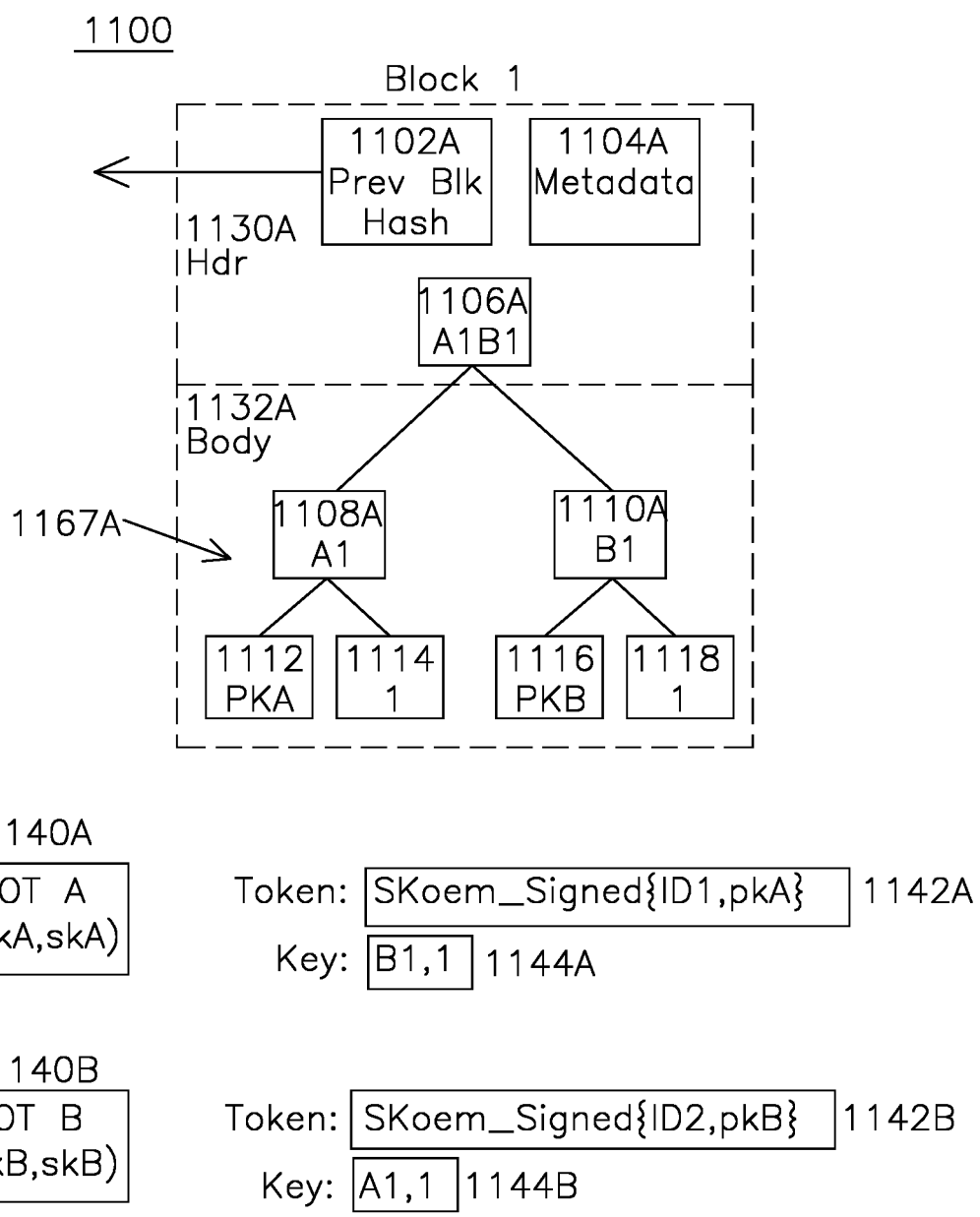
FIGS. 11A-11C are block diagrams each showing concatenated blocks in a blockchain, wherein the blocks illustrate a method of updating a revocation list for storage in the last block of the blockchain and for updating a key used to verify data Merkle roots during authentication of lightweight nodes.
Figure 11B:
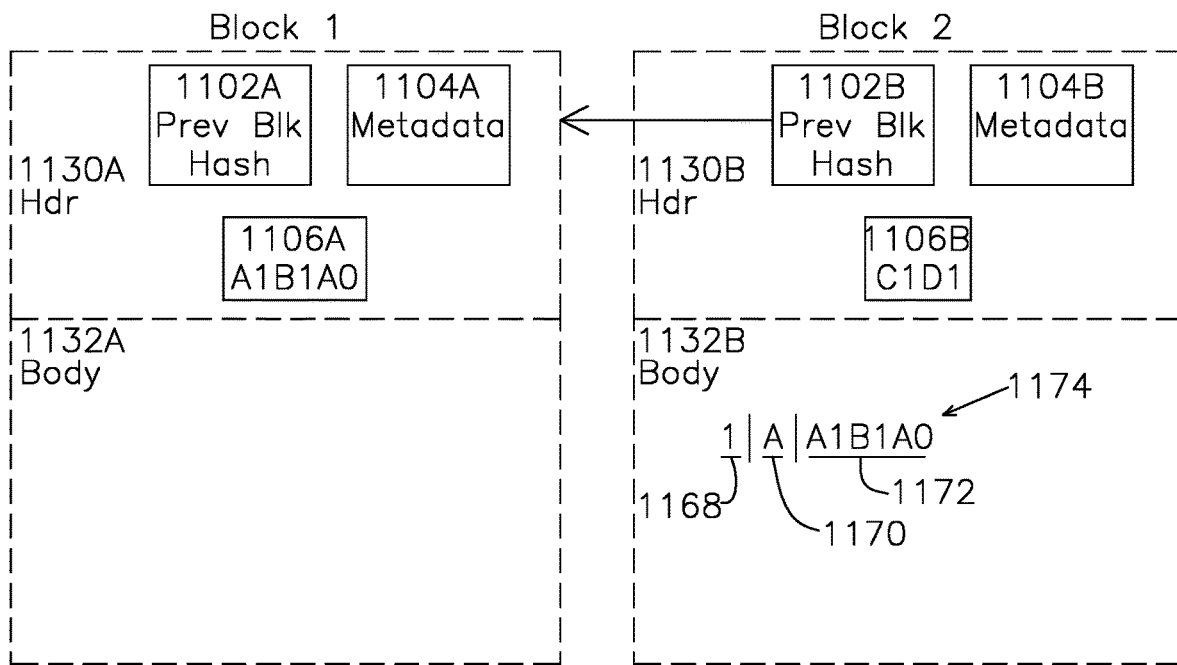
Figure 11C:
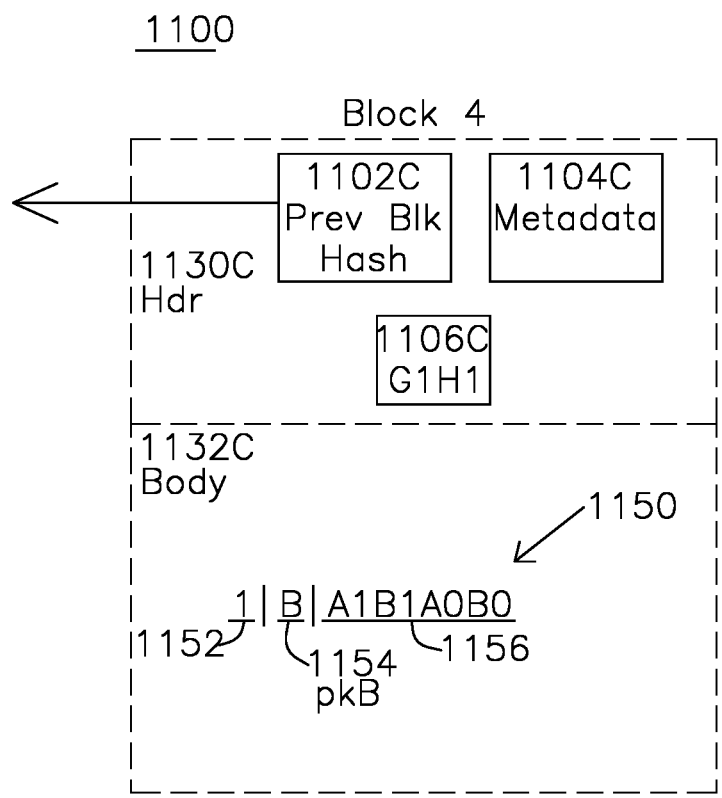

Turning to FIGS. 11A-11C, a process of updating the revocation list and a key having both intermediate hashes and a block identifier is presented as follows.

As shown in FIG. 11A, an exemplary blockchain 1100 contains at least Block 1. Block 1 appends to a blockchain of earlier concatenated blocks, not shown. For illustrative purposes Block 1 contains simplified block headers 1130A. Block headers 1130A includes the previous block hash 1102A, the metadata 1104A, and a first data Merkle root A1B1 1106A for block 1. Also, by way of simplified illustration, Body 1132A of block 1 is contains a data Merkle tree 1167A and excluding a transaction Merkle tree and a revocation list.

The data Merkle root A1B1 1106A of data Merkle tree 1067A is formed by applying a hashing function to two leaf nodes A1 1108A and B1 1110A. The leaf node A1 1108A is derived by applying a hash function to a public key PKA 1112 concatenated with a validity value 1114 shown in FIG. 11A as a bit "1" indicating a valid public key. A bit value of "0" would indicate to a revoked public key. Accordingly, the derivation of leaf node A1 is mathematically expressed as A1=H(PKA∥1).

Similarly, the leaf node B1 1110A is formed by applying hashing function to a public key PKB 1116 concatenated with a validity value 1118. It is noted that elements 1112, 1114, 1116, and 1118 are not part of data Merkle tree 1167A and are presented for illustration purposes only.

In FIG. 11A, public key PKA corresponds to lightweight node 1140A, IoT A, with public key PKA and private key SKA. Public key PKB corresponds to lightweight node 1140B, IoT B, with public key PKB and private key SKB. For the embodiment of FIG. 11A, both of public keys PKA and PKB are being enrolled in a decentralized network as part of block 1, thereby registering lightweight nodes 1140A, 1140B in the decentralized network.

As part of an interaction with a OEM node, such as for example the interaction between OEM node 302 and IOT node 304 in FIG. 3A, both of the lightweight nodes 1140A, 1140B received tokens 1142A and 1142B respectively. The token 1142A includes a signature created by signing an identifier ID1 and public key PKA with a private key, $SK_{OEM}$, of an OEM node 302. ID1 identifier is derived from a hash function applied to the public key PKA. This identifier ID1 together with public key A are signed by the private key, $SK_{OEM}$, of an OEM node. In a similar manner, Token 1142B signature uses ID2, namely a hash function of public key PKB, and public key PKB signed by the private key of the OEM node, $SK_{OEM}$.

On successful verification and addition of block 1 to blockchain 1100, lightweight node 1140A stores an intermediate hash B1 and the block identifier "1", which collectively define key 1144A as shown on FIG. 11A. Similarly, lightweight node 1140B stores both an intermediate hash A1 and the block identifier "1" which collectively define key 1144B. The intermediate hashes then can be used to recompute the data Merkle root A1B1. For example, for lightweight node 1140A, could take these steps: (1) computing a hash of PKA and 1, H(PKA∥1), to obtain A1, (2) compute the hash of A1 and B1 to obtain A1B1.

Referring now to FIG. 11B, at a point further in time, block 1 and an additional block 2 have been sequentially added to blockchain 1100. Similar to discussion above regarding the formation of block 1 above, block 2 includes a simplified header 1130B and a body 1132B. Header 1130B includes a previous block hash 1102B, metadata 1104B, and a data Merkle root C1D1 1106B formed by hashing nodes C1 and D1 which would have been formed from leaf nodes and subsequent deletion of the intermediate hashes of C1, D1.

As noted above, at this point in time, block 1 has been verified and added to blockchain 1100. And block 2 has also been verified and added to blockchain 1100. In addition, the nodes A1, B1 of block 1 have been removed from the block body 1132A. Similarly previously-existing nodes C1, D1 have been deleted from body 1132B. The block body 1132A of block 1 is empty and the block body 1132B of block 2 has only revocation list 1174 as the only entry for block 1 shown in FIG. 11B.

Because it is not the last block in the blockchain, Block 1 does not have the revocation list. As shown on displayed portion of revocation list 724 of FIG. 11B, public PKA associated with lightweight node 1140A indicates a revoked status. A block identifier is added to a revocation list 1174 if there is a revocation of a public key corresponding to the block having the associated block identifier. Thus, if public key PKA had not been revoked, block 1 would not have provided an identifying entry to the revocation list 1174.

The revocation of public key A in block 2 is indicated by the relevant portion of the revocation list 1124 with the following mathematical expression: 1∣A∣A1B1A0. In other words, the revocation list 724 contains a similar type of entry for each block in which a now-revoked public key was enrolled on the network.

For the given entry 1∣A∣A1B1A0, the leading "1" is a block identifier 1168 referring to block 1, in which public key PKA was enrolled. The first "A" after the "1" is the public key 1170 that was revoked "A" for PKA. The next field "A1B1A0" is an updated data Merkle root 1172. It is updated by having A0 added to the original data Merkle root. The resulting nomenclature A1B1A0 thus indicates an updated status from A1B1.

Recall that when Block 1 was added to the blockchain, its data Merkle root 1106A was A1B1. Because public key A is now revoked, a new hash is added, and mathematically expressed as: H(pkA∥0). A hash function of public key A concatenated with a "0" revocation indication, thus yields A1B1A0 as the updated data Merkle root 1106A.

Once block 2 with its revocation of public key A is verified and added to the blockchain, lightweight node 1140A updates its corresponding key 1144A by updating its intermediate hash B1 to add A0, to make the new intermediate hash B1, A0 and with block identifier "1". And lightweight node 1140B will update its intermediate hash A1 to add A0, to make the new intermediate hash A1, A0 and the block identifier "1".

These updated intermediate hashes for 1140A, 1140B are used to recompute the updated data Merkle root A1B1A0 1174. For example, lightweight node 1140A implements these steps: (1) compute hash of pkA concatenated with "1": H(pkA∥1) to obtain A1, (2) compute the hash of A1 and B1 to obtain A1B1, and (3) compute the hash of A1B1 and A0 to obtain A1B1A0.

Referencing FIG. 11C, a later block 4 of blockchain 1100 is illustrated. Similar to blocks 1 and 2, block 4 has a simplified header 1130C and a body 1132C. Header 1130C includes previous block hash 1102C, metadata 1104C, and a data Merkle root G1H1 1106C.

At this point in time, blocks 3 (not shown) have been verified and added to blockchain 1100. In addition, the G1 and H1 nodes have been dropped from the block body 1132C, which is empty except revocation list 1150 as the only entry shown for block 1. From examining the displayed portion of revocation list 1124, it is known that in addition to public key PKA, public key B, PKB, has also been revoked.

The revocation of public key PKB is indicated by the relevant portion of revocation list 1150: 1∣B∣A1B1A0B0. In the entry 1∣A∣A1B1A0B0, the leading "1" is a block identifier 1152 referring to block 1, in which public key PKB was enrolled. The first "B" after the "1" is the identifier 1154 for the public key that is additionally revoked "B" for PKB. The next field "A1B1A0B0 is an updated data Merkle root 1156. The data Merkle root 1156 is updated by having B0 added to the previous version of the data Merkle root resulting in an update from A1B1A0 to A1B1A0B0.

In view of the revocation of PKB, lightweight node 1140A updates its intermediate hash B1, A0 to add B0, to make the new intermediate hash B1, A0, B0 and with block identifier "1", thus updating key 1144A. Similarly, lightweight node 1140B updates its intermediate hash A1, A0 to add B0, to make the new intermediate hash A1, A0, B0 and with the block identifier, thus updating key 1144B.

These updated intermediate hashes can be used to recompute the updated data Merkle root A1B1A0B0 1156. For example, lightweight node 1142A implements the following steps: (1) compute hash of pkA concatenated with "1": H(pkA||1) to obtain A1, (2) compute the hash of A1 and B1 to obtain A1B1, (3) compute the hash of A1B1 and A0 to obtain A1B1A0, and (4) compute the hash of A1B1A0 and B0 to obtain A1B1A0B0.

With the additional information obtained via FIGS. 10-11C, we return to reference FIG. 8. The authentication process is updated to use a revocation list. For example, above it is discussed that upon receiving transmission 813, the first lightweight node 802 performs the operations previously discussed to verify the public key PK2 of the second light weight node 804. This previous description is updated to verify the validity of the public key PK2 of the second lightweight node 804 by first checking a revocation list 872A in the last block B2 of the blockchain 806 for a revocation associated with block B1. If block B1 is in the revocation list 872A, then verify the data Merkle root as per the above discussion. If the extracted and computed data Merkle roots match, then additionally, do a further comparison in which a hash (e.g. (hash(PK2||0)) of the public key PK2 concatenated with the validity indicator 0 (for invalid) is compared to the intermediate hash 860 received from lightweight node 804. If there is a match, then the public key PK2 is revoked and authentication fails.

If block B1 is not in the revocation list, then verify the Merkle root (now obtained from block B1) as per the above discussion. If the extracted and computed data Merkle roots match, then PK2 is valid. The signature 854 may be verified with the public key PK2 as discussed above relative to FIG. 8. A similar process would be performed by lightweight node 804 on receiving transmission 815, including referencing revocation list 872B.

Referring now to FIG. 12, a chart 1200 regarding comparisons of optimized and nonoptimized storage configurations is presented. Rows A, B, C, and D present storage requirements for various elements based on whether an implementation uses an optimized system and an unoptimized system by comparison. A bottom row of chart 1200 provides some comparative memory storage totals. Optimizations include (1) keeping a revocation list only in the last block of the blockchain and dropping the transaction Merkle tree nodes, the data Merkle tree nodes, and the transactions from the bodies of blocks on verification of a block.

Columns include "Blockchain components" which are the components being analyzed, "size" is size with optimization in bytes without regard to specific circumstances.

The third column of chart 1200 examines size with optimization having assumptions that include where x (number of blocks in a blockchain)=100, RB (the number of blocks with at least one revoked public key)=50, and n (the number of public keys registered per block)=16.

The fourth column of chart 1200 examines the same assumptions as the third column but without optimization.

Starting with row A, the component is the block header. In the second column size with optimization is 232 bytes. In the third column, with the size is still 232 bytes. In the fourth column, without optimization, the block header is 200 bytes because a traditional block header does not include a data Merkle root.

Moving to row B, the component is the revocation list. In the second column the size is 96 bytes multiplied by the number of blocks with at least one revoked public key. In the third column, with the assumption of 50 blocks with a revocation, the size is 4.8 KB. In the fourth column which is unoptimized but includes a revocation list, the size is 25.6 KB. This size is computed using 32 bytes*number of revoked public keys, revocation list in last block only.

Moving to row C, the component is the blockchain with x blocks. In the second column, size is 232*x*96*RB. In the third column, with the assumptions for x, RB, and n, the size is 28 KB. In the fourth column that is unoptimized, the size is 455.2 KB, which is (200 B+n*256 B)*x+25.6 KB having a transaction size of 256 bytes.

In row D, the component is an intermediate hash list. For purposes of these computations "n" is the number of public keys enrolled in one block. In the second column the size is 32*[ceil{log 2(n)}+n] which assumes all the public keys are revoked. In the third column, the size with the assumptions is 640 B. In the third column that is unoptimized, the size of an intermediate hash list is not applicable.

In the bottom row, the total of rows C and D is given for the third and fourth columns. The third column that is optimized, the total size is 28.64 KB. In the fourth column that is unoptimized, the total size is 455.2 KB. Thus, the optimizations discussed herein save significant storage size.

Referencing FIG. 13A-13C various transmissions among various entities including network transactions relating to device enrollment, one-time registration (OTR), certificate enrollment, and authentication are discussed.

Referencing FIG. 13A, three phases are presented as follows: an enrollment phase 1301, an OTR phase 1302, and a revocation phase 1303. Transmissions are between (1) a Device$_A$ 1320 shown as a lightweight node, such as an IoT node, (2) a first efficient storage circuit A$_{(ESCA)}$ associated with Device$_A$ 1320 illustrated as an efficient storage circuit, such as ESC 911 of FIG. 9, (3) an OEM node 1332, (4) a second efficient storage circuit, ESC$_{OEM}$, associated with OEM node 1332, and (5) a network consensus—referring to all nodes of the network working to achieve consensus for a given block with respect to the blockchain with a lightweight consensus algorithm, such as Neurochain.

Enrollment phase 1301 is a first stage of registration for Device$_A$ 1320 on a decentralized blockchain network. Enrollment phase 1301 begins with transmission 1304 from Device$_A$ 1320 to OEM node 1322. This transmission 1304 includes a public key PKA of Device$_A$ and ID1 that is a hash function of the key PKA. Transmission 1304 is at least similar to transmission 306 of FIG. 3A discussed above and the discussion of the same is applicable to transmission 1304.

Enrollment phase 1301 continues with transmission 1305 from OEM node 1322 to Device$_A$ 1320. Transmission 1305 includes T, B0, and timestamp. As shown in FIG. 13A, token T, such as token_T0 of FIG. 3A, includes at least SK$_{OEM}$Signed{ID$_{DeviceA}$, PKA, timestamp), where SK$_{OEM}$ is the private key of OEM node 1322, which is used to sign (1) PKA which is the public key of Device$_A$ 1320, and ID$_{DeviceA}$ which is a hash of PKA and timestamp. FIG. 13A shows a genesis block B0, such as Genesis Block B0 310 of FIG. 3B. The above discussion relative to transmission 308 of FIG. 3A is applicable to transmission 1305.

Turning to the one time registration, OTR, phase 1302, this is a second stage of enrollment of Device$_A$ 1320 in a network. OTR phase 1302 begins with a transmission 1306 from Device$_A$ 1320 to implement consensus 1324 of a transaction (e.g. transaction T1 of FIG. 4), which transmission is a broadcast to the nodes of the network to begin a consensus process according to protocols from a lightweight consensus algorithm, such as Neurochain.

OTR phase 1302 continues with a transmission 1307 from the nodes applying consensus 1324 protocols to both the OEM node 1322 and the $Device_A$ 1320. The transmission is of a block B containing the transaction previously transmitted by $Device_A$ 1320 as one its transactions. According to a lightweight consensus algorithm, at least one of the nodes is a designated miner as per the consensus protocols for transmitting transaction into proposed block B. Accordingly, the designated miner and possibly other lightweight nodes then transmit B as per transmission 1307.

OTR phase 1302 continues with verifications 1308A, 1308B, which are verifications by, respectively, $Device_A$ 1320 and OEM node 1322 of block B. This verification is performed according to the verification procedures specified by a lightweight consensus algorithm.

On successful verification, OTR phase 1302 continues with storing of B by both $Device_A$ 1320 and OEM node 1322 via transmissions 1309A, 1309B to, respectively, ESC A 1320 and $ESC_{OEM}$ 1323. On successful storage of B by ESC A 1320 and $ESC_{OEM}$ 1323 acknowledgement transmissions 1310A and 1310B are respectively sent from ESC A 1320 and $ESC_{OEM}$ 1323 to $Device_A$ 1320 and OEM node 1322. On successful verification and storage of block B, $Device_A$ 1320, and specifically the public key PKA identifier of $Device_A$ 1320, is enrolled in the network.

Revocation phase 1303 is triggered by a revocation of a public key that is registered on a decentralized network. In operation, the process for a revocation is similar to that for a one-time registration (OTR). Specifically, revocation phase 1303 begins with a transmission 1311 from $Device_A$ 1320 to OEM node 1304 requesting that a key be revoked. OEM node 1304 responds with transmission 1316 to implement consensus 1324. Transmission 1316 includes a transaction R shown if FIG. 13A. In one embodiment, the consensus process uses a lightweight consensus algorithm, such as, for example, Neurochain. A lightweight consensus algorithm designates a blockchain miner role to a lightweight node as the miner that packages transaction R, along with other transactions, into a proposed block, such as block B, for consensus by the decentralized network of lightweight nodes. A miner or other node may broadcast block B to lightweight nodes, including $Device_A$ 1320 and the OEM node 1322 in transmission 1317. $Device_A$ 1320 and OEM node 1322 then perform verifications 1313A, 1313 B, respectively, of block B according to a lightweight consensus algorithm.

On successful verification of block B, revocation phase 1303 continues with storing of B by both $Device_A$ 1320 and OEM node 1322 via transmissions 1314A, 1314B to, respectively, ESC A 1320 and $ESC_{OEM}$ 1323. On successful storage of B by ESC A 1320 and $ESC_{OEM}$ 1323 acknowledgement transmissions 1315A and 1315B are sent from, respectively, ESC A 1320 and $ESC_{OEM}$ 1323 to $Device_A$ 1320 and OEM node 1322, respectively. On successful verification and storage of block B, the public key in question is revoked on the network.

Referencing FIG. 13B, an authentication process 1319 among $Device_A$ 1320 and $Device_B$ 1325, both lightweight nodes, such as an IoT node, is presented. $Device_A$ 1320 is associated with an efficient storage circuit (ESCA) 1321 and $Device_B$ 1325 is associated with another efficient storage circuit ($ESC_B$) 1326. The authentication process opens an encrypted channel for secured communication between $Device_A$ 1320 and $Device_B$ 1325.

Authentication Process 1319 begins with transmission 1330 from $Device_A$ 1320 to $Device_B$ 1325 transmitting a random challenge, such as a nonce1.

$Device_B$ 1326 responds with transmission 1331, which includes (1) a public key of $Device_B$ (PKB), (2) a signature which consists of nonce1 signed with a private key (SKB) of $Device_B$, (3) an intermediate hash list associated with $Device_B$ ($IHL_B$) where the list includes a block number B in which $Device_B$ was registered in the network, and (4) a second random challenge in the form a nonce2 as shown. In some embodiments the block number is provided separately from $IHL_A$.

In operation 1332 $Device_A$ 1320 extracts block number B from $IHL_B$. $Device_A$ 1320 makes transmission 1334 to ESCA requesting current block B' (last block in a blockchain, which is the block with a revocation list) stored in memory (e.g. in a local copy of a blockchain) and receives block B' via transmission 1335 from ESCA.

$Device_A$ 1320 checks a revocation list in the current block B' to determine if there is an entry for block B in the revocation list, RL. Accordingly, depending on the result, at least one set of operations is performed by $Device_A$ 1320.

a. If an entry for block B exists in the revocation list, then steps 1-5 are performed by $Device_A$ 1320 as follows: (1) Fetching a stored data Merkle root that is stored in the revocation list (RL) against block B; (2) Re-compute the data Merkle root using the supplied $IHL_B$ and the supplied public key PKB concatenated with the validity indicator, shown as "1" for valid; (3) Verifying the stored data Merkle root against the re-computed data Merkle root, by determining if they are the same; (4) if the stored data Merkle root is verified, then compare the intermediate hashes in the supplied $IHL_B$ with Hash(PKB∥0), where the '0' being an invalidity bit; and (5) if there is a match, then PKB is revoked and invalid, otherwise PKB is deemed valid.

b. If an entry for block B does not exist in the RL, then a data Merkle root must be obtained from block B in which $Device_B$ 1325 was registered on the network. $Device_A$ 1320 sends transmission 1337 to request block B from ESCA 1321 and receives block B by transmission 1338 from the ESCA 1321. Then $Device_A$ 1320 performs the following 1339 steps (a) thru (c): (a) Re-computing the data Merkle root using the supplied $IHL_B$ and the supplied public key PKB concatenated with the validity indicator "1"; (b) Fetching a stored data Merkle root from block B; and (c) if the re-computed data Merkle root is equal to the stored data Merkle root, then designating PKB as valid.

If PKB is valid, then in operation 1340 $Device_A$ applies PKB to the signature, signed with SKB, to verify the validity of the signature. If the signature is valid, then $Device_B$ is authorized source of PKB and $Device_B$ is authenticated.

Referencing FIG. 13C, if $Device_B$ 1325 is authenticated, then the authentication process 1319 continues with authentication of $Device_A$ 1320 to $Device_B$ 1325. This part of process 1319 follows the above disclosed authentication of $Device_B$ 1325 to $Device_A$ 1320.

The authentication of $Device_A$ 1320 begins with $Device_A$ 1320 sending transmission 1351, which includes (1) a public key of $Device_A$ (PKA), (2) a signature which consists of nonce 2 signed with a private key (SKA) of $Device_A$ 1320, (3) and an intermediate hash list associated with $Device_A$ ($IHL_A$) including a block number B in which $Device_A$ was registered in the network. In some embodiments the block number is provided separately from $IHL_A$.

In operation, 1352 Device$_B$ 1325 extracts block B from IHL$_A$. Device$_B$ 1325 makes transmission 1354 to ESC$_B$ requesting current block B' last block in a blockchain, which is the block with a revocation list stored in a local copy of a blockchain and receives block B' via transmission 1355 from ESC$_B$.

Device$_B$ 1325 checks a revocation list in the current block B' to determine if there is an entry for block B in the revocation list (RL). Depending on the result, one set of operations or another set of operations is performed by Device$_B$ 1325.

a. If an entry for block B exists in the revocation list, then steps 1-5, shown collectively in FIG. 13B as operations 1356, are performed by Device$_B$ 1325: (1) Fetching a stored data Merkle root that is stored in the revocation list (RL) against block B; (2) Re-computing the data Merkle root using the supplied IHL$_A$ and the supplied public key PKA concatenated with the validity indicator "1" (e.g. a validity bit); (3) Verifying the stored data Merkle root against the re-computed data Merkle root, by determining if the same; (4) if the stored data Merkle root is verified, then comparing the intermediate hashes in the supplied IHL$_A$ with Hash(PKA||0), the 0 being an invalidity bit; and (5) if there is a match, then PKA is revoked as invalid, otherwise PKA is deemed as valid.

b. If an entry for block B does not exist in the RL, then a data Merkle root must be obtained from block B in which Device$_A$ 1320 was registered on the network. Device$_B$ 1320 sends transmission 1357 to request block B from ESC$_B$ 1326 (e.g. Block B is stored as part of a locally-stored blockchain) and receives block B by transmission 1358 from the ESC$_B$ 1326. Then DeviceB 1326 performs the following steps (a) through (c) as collectively shown in FIG. 13 B as operations 1359: (a) Re-computing the data Merkle root using the supplied IHL$_A$ and the supplied public key PKA concatenated with the validity indicator "1"; (b) Fetching a stored data Merkle root from block B; and (c) if the re-computed data Merkle root is equal to the stored data Merkle root, then designating PKA as valid.

If PKA is valid, then in operation 1360 Device$_A$ applies PKA to the signature signed with SKA to verify the validity of the signature. If the signature is valid, then Device$_A$ is the authorized source of PKA and Device$_B$ 1325 is authenticated.

Referencing FIG. 14A, a process 1400 of optimizing a blockchain is disclosed. Process 1400 is performed with a device 1401, a lightweight node, an efficient storage circuit 1402, such as (for example ESC 911 of FIG. 9), and a memory 1403 (for example, secure flash memory 908 of FIG. 9). In some embodiments, device 1401 communicates with ESC 1402 via a databus that is part of device 1401. That is, ESC 1402 is part of device 1401.

Process 1400 begins with a first device identifying whether device 1401 is already registered on the network. If there is a determination 1404A that device 1401 is not registered in the network, then a second device determination 1405 is whether the device 1401 has a registration in block B which is being added to the network through consensus protocols. In some embodiments, determination 1404A is performed by verifying that an enrolled transaction for a device is added in the body of a block of a blockchain.

If block B contains a registration for device 1401, then transmission 1407 sends block B to the ESC 1402 associated with device 1401. In operation 1408, ESC 1402 extracts an intermediate hash list from block B. Because, Block B is not yet added to the network, body of block B still has complete data Merkle tree. In transmission 1409, ESC 1402 sends the intermediate hash list to memory 1403 along with a request for block B', which is the current block of the blockchain that is locally stored. Memory 1403 both stores the intermediate hash list in memory that is separate from local copy of blockchain and transmits block B' to ESC 1402 in transmission 1410. ESC 1402 then performs operation 1411 which includes the following steps 1-2: (1) updating block B by dropping all transactions and data from block B except for revocation list; and (2) updating block B' by dropping the revocation list from previous block B', which will no longer be the current and last block appended to the blockchain. Thus, block B' will no longer contain the revocation list. In transmission 1412, ESM then transmits updated blocks B and B' to memory 1403 for storage. In transmission 1413, memory 1403 confirms successful storage to ESC 1402.

Returning to determination 1405, responsive to a determination that device 1401 is not registered on the network in block B, control moves to transmission 1414 with transmission of block B to ESC 1402. In transmission 1415, ESC 1402 requests block B' from memory 1403, whereby block B' is the last block in the local copy of blockchain. In operation 1416, memory 1403 transmits block B' to ESC 1402. On receipt, ESC 1402 then performs operation 1417 which includes the following steps 1-2: (1) updating block B by dropping all transactions and data from block B except for a revocation list; and (2) updating block B' by dropping the revocation list from previous block B', which will no longer be the latest block appended to the blockchain so as to no longer contain the revocation list. In transmission 1418, ESM 1402 then transmits updated blocks B and B' to memory 1403 for storage. Memory 1403 confirms successful storage to ESC via transmission 1419.

Figure 14B:
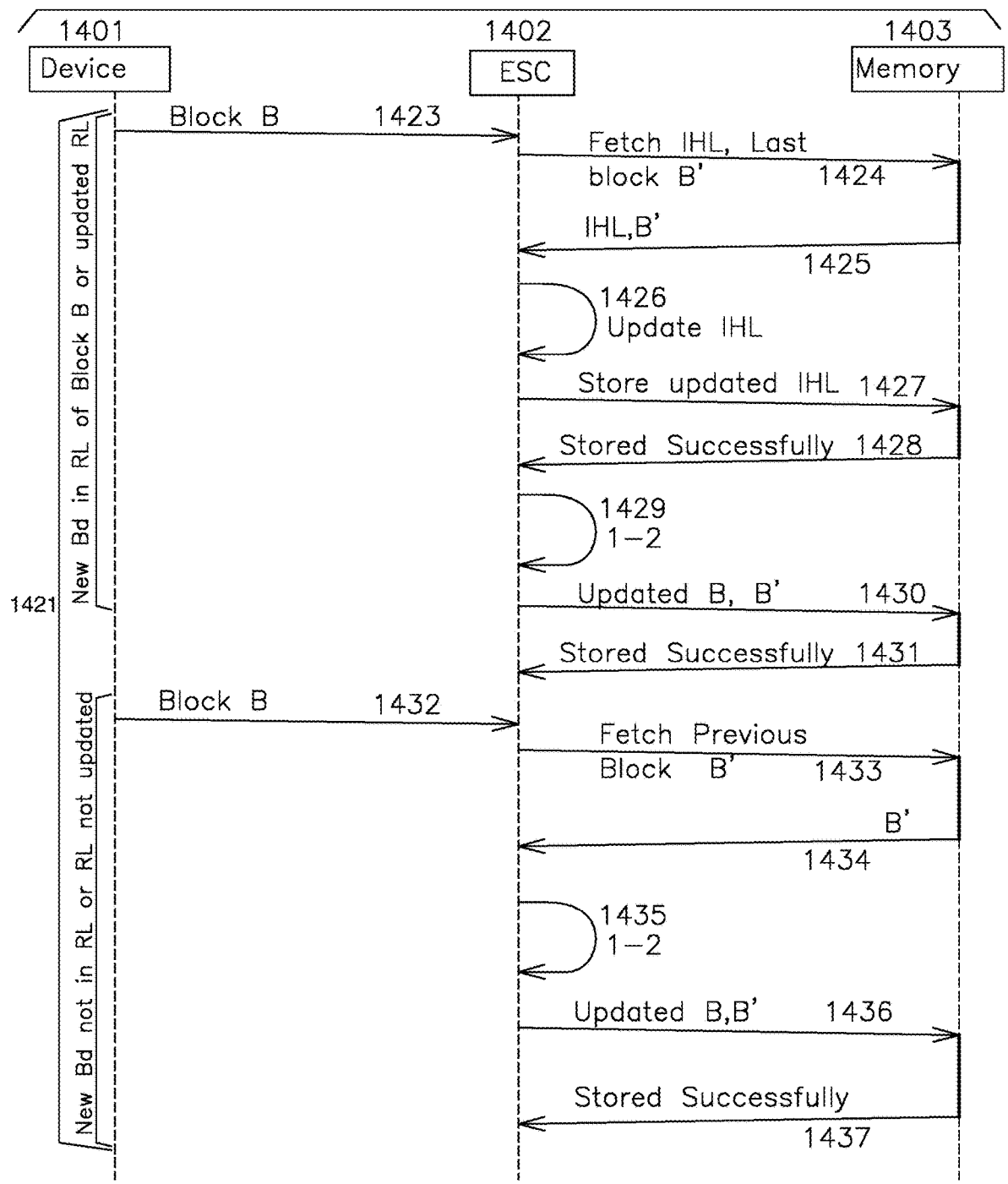

Continuing the process 1400 now with reference to FIG. 14B, the device control moves to operation 1421 on determining 1404B that that device 1401 is already registered in the network. In operation 1421 there is a determination of whether there is either a new entry for block B$_D$ (the block where device D 1401 got registered) in the revocation list in block B or if an entry for B$_D$ in the revocation list in block B is updated. For example, operation 1421 evaluates to yes when a public key that was registered in B$_D$ is revoked and when an entry in the revocation list entry for block B$_D$ is updated to show an additional public key revocation.

If operation 1421 evaluates to yes, then device 1401 performs transmission 1423 sending block B to ESC 1402. Advancing to operation 1424, ESC 1402 requests an intermediate hash list and previous block B' from memory 1403. Responsively, in transmission 1425, memory 1403 sends the intermediate hash list and block B' to ESC 1402. ESC 1402 updates the intermediate hash list (e.g. to reflect new revocation of a public key) in operation 1426. Transmission 1427 sends the updated intermediate hash list to memory 1403 for storage. Memory 1403 confirms successful storage of the updated intermediate hash list in transmission 1428.

ESC 1402 then performs operation 1429 that includes the following steps 1-2: (1) updating block B by dropping all transactions and data from block B except for a revocation list; and (2) updating block B' by dropping the revocation list from previous block B', which will no longer be the last block in the blockchain so as to no longer contain the revocation list. In transmission 1430, ESM then transmits updated blocks B and B' to memory 1403 for storage. Memory confirms successful storage to ESC via transmission 1431.

If it is determined in operation 1421 that block B does not contain a new entry for block or any new entry for B$_D$ in the revocation list (in block B), then control moves to transmission 1432 of block B from device 1401 to ESC 1402. In operation 1433 device 1401 requests block B' (the current block and/or the last block in the blockchain) which contains the revocation list. Memory 1403 sends block B' to ESC 1402 in operation 1434.

ESC 1402 then performs operation 1435 which includes steps 1-2: (1) updating block B by dropping all transactions and data from block B except for a revocation list; and (2) updating block B' by dropping the revocation list from previous block B', which will no longer be the current block (e.g. the last block in the blockchain) and thus will no longer contain the revocation list. ESM then transmits updated blocks B and B' to memory 1403 in transmission 1436 for storage. Memory confirms successful storage via transmission 1437 to ESC.

Various embodiments are now discussed.

In some embodiments, a lightweight node in a decentralized network includes at least a plurality of other lightweight nodes. The lightweight node includes at least one memory 908 storing a blockchain 806, 808. The blockchain includes at least a plurality of blocks 700. The lightweight node operates to add blocks to the blockchain successively.

A given block of the blockchain includes at least one header 740 and a body 742, The header includes at least a data Merkle root. The data Merkle root defined as a root hash of a data Merkle tree with one or more leaf nodes 726A, 726B. The at least one leaf nodes 726A, 726B are one or more hashes. Specifically, a given hash of the one or more hashes is a hash of a combination of (1) a public key associated with a lightweight node of the decentralized network and (2) of a validity value (e.g. 768) associated with the public key indicating whether the public key is a valid public key on the decentralized network. The data Merkle root is insufficient for restoring the data Merkle tree. However, with at least a public key and an intermediate hash the date Merkle root is sufficient for at least partly verifying the public key.

In some embodiments, memory 908 further stores at least (a) a block identifier for a block in the blockchain in which a transaction enrolling a public key of the lightweight node on the decentralized network had been entered, and (b) an intermediate Merkle tree hash, associated with the block and with the lightweight node.

In some embodiments the header 740 of the given block 700 further includes at least a hash of a previous block 702 and a transaction Merkle root 704. In some further embodiments the transaction Merkle root includes a root hash of the following (1) a revocation list 724 that includes data regarding at least revoked public keys, and (2) a transaction Merkle tree with one or more leaf nodes that are hashes of data that represent at least transaction data.

In some embodiments, such as shown in FIG. 10, transaction data has been removed from the body of the block.

In some embodiments, a body of a block that is most recently added to the blockchain includes at least a revocation list for identifying public keys that have been revoked on the decentralized network. In some further embodiments, the revocation list has an entry for each block of the blockchain that is associated with a revoked public key. In some yet further embodiments, a given entry includes at least one identifier 1152 of the block associated with the entry, one or more identifiers 1154 associated with one or more public keys associated with the block that have been revoked, and a data Merkle root 1156 for the block that has been updated with identifiers of the one or more revoked public keys.

In some embodiments, a method of authentication is performed with a first lightweight node on a decentralized network that has a plurality of lightweight nodes having at least the first lightweight node and a second lightweight node. The method includes at least transmitting at least a first nonce to the second lightweight node. The method further includes receiving from the second lightweight node at least a public key associated with the following: the second lightweight node, an identifier associated with a block of a blockchain in which an enrollment of the second lightweight node was recorded, an intermediate Merkle tree hash associated with the second lightweight node, and a signature created with at least the first nonce and a private key associated with the second lightweight node.

The method further includes determining if the block is referenced on a revocation list that identifies one or more revoked public keys. If the block is referenced then determining if a data Merkle root stored on the revocation list for the block matches a data Merkle root computed with at least the public key and the intermediate Merkle tree hash. If the two data Merkle roots match then determining if a hash of the public key and an validity value indicating revocation matches a hash on the intermediate hash and responsive to a match determining that the public key is revoked and that the second lightweight node cannot be authenticated.

In some embodiments, the method further includes at least if the block is not referenced on the revocation list, then determining if a data Merkle root stored on the revocation list for the (registered) block matches a data Merkle root computed with at least the public key and the intermediate Merkle tree hash. If there is a match, determining that the public key is enrolled on the decentralized network.

In some embodiments, the method further includes at least verifying the signature with at least the public key associated with the second lightweight node. On successful verification, determining that the second lightweight node is authentic.

In some embodiments, a method for authentication is performed within a decentralized network, the decentralized network having a plurality of lightweight nodes including a first and a second lightweight node. The method includes at least:

Initiating an authentication sequence from the first to the second lightweight node. That is, in some embodiments two lightweight nodes authenticate each other for purposes of opening a secure channel of communication. For example, as shown and described relative to FIG. 8. The authentication sequence includes at least the following steps:

(a) Self-verifying the validity of the first lightweight node on the blockchain. That is the first lightweight node responds to a challenge by providing data elements so that the second lightweight node can verify the first lightweight node. An example is as shown via transmission 813 of FIG. 8.

(b) Ensuring a valid public key is enrolled in the decentralized network. In some embodiments this includes checking a revocation list and verifying a data merkle root. These procedures are described above regarding operations 1336 and 1339 of FIG. 13B.

(c) Verifying ownership of the public key assigned to the second lightweight node by the first lightweight node. That is, if the public key is verified, then determining ownership of the public key. These procedures are described above regarding operation 1340 of FIG. 13B.

In some embodiments, the method further includes the step of sending a hello message from the first lightweight node to the second lightweight node. In some yet further embodiments, the method further includes the step of identifying most recent block to identify a revocation list.

In some further embodiments, the step of sending a hello message includes at least a first challenge nonce from the first lightweight node to the second lightweight node and then a second challenge nonce from the second lightweight node to the first lightweight challenge node.

In some embodiments, the method further includes the steps of generating the genesis block a trusted node, and sending the genesis block from the trusted node to each lightweight node comprising the plurality of lightweight nodes.

In some embodiments, the method further includes the step of the first lightweight node accessing a last block on blockchain to access a revocation list; and identifying if a block associated with enrollment of the second lightweight node is referenced by the revocation list. In a further embodiment, the method further includes the steps of obtaining the data Merkle root of the block from the revocation list; computing a data Merkle root with a public key associated with the second lightweight node and with an intermediate hash provided by the second lightweight node; and comparing the computed data Merkle root with the stored data Merkle root from the revocation list.

In a yet further embodiment, the method further includes the step of validating a public key associated with the second lightweight node responsive at least in part to verifying a match between the computed data Merkle root and the stored data Merkle root.

In some embodiments, the method further includes the step of storing all the intermediate hashes of the data Merkle root for a given block and dropping all transaction from the body of the block to define a block having a retained block header and a revocation list in the body for the last block.

Although the present invention has been described in detail, it should be understood that various changes, substitutions, and alterations could be made hereto without departing from the spirit and scope of the invention as defined by the appended claims.

We claim:

1. A method of authentication performed with a first lightweight node on a decentralized network that has a plurality of lightweight nodes, including at least the first lightweight node and a second lightweight node, the method comprising:
transmitting at least a first nonce to the second lightweight node;
receiving from the second lightweight node at least a public key associated with the second lightweight node, an identifier associated with a block of a blockchain in which an enrollment of the second lightweight node was recorded, an intermediate merkle tree hash associated with the second lightweight node, and a signature created with at least the first nonce and a private key associated with the second lightweight node;
determining if the block is referenced on a revocation list that identifies one or more revoked public keys, and:
(a) if the block is referenced then determining if a data merkle root stored on the revocation list for the block matches a data merkle root computed with at least the public key and the intermediate merkle tree hash; and
(b) if the two data merkle roots match then determining if a hash of the public key and a validity value indicating revocation matches a hash on the intermediate hash and responsive to a match determining that the public key is revoked and that the second lightweight node cannot be authenticated;

whereby:
if the block is not referenced on the revocation list, then determining if a data merkle root stored on the revocation list for the registered block matches a data merkle root computed with at least the public key and the intermediate merkle tree hash; and
if the block is referenced on the revocation list, determining that the public key is enrolled on the decentralized network.

2. The method of claim 1, further comprising:
verifying the signature with at least the public key associated with the second lightweight node; and
upon successful verification, determining that the second lightweight node is authentic.

3. The method of claim 1 wherein at least one said block comprises a header, the header including at least a hash of a previous block and a transaction merkle root.

4. The method of claim 3 where the transaction merkle root includes a root hash of:
(1) a revocation list that includes data regarding at least revoked public keys, and
(2) a transaction merkle tree with one or more leaf nodes that are hashes of data that represent at least transaction data.

5. The method of claim 1 where a body of a block that is most recently added to the blockchain includes at least a revocation list for identifying public keys that have been revoked on a decentralized network.

6. The method of claim 5 wherein the revocation list has an entry for each block of the blockchain that is associated with a revoked public key.

7. The method of claim 6 where the entry includes at least an identifier of the block associated with the entry, one or more identifiers associated with one or more public keys associated with the block that have been revoked, and a data merkle root for the block that has been updated with indicators of the one or more revoked public keys.

8. A non-transitory computer readable medium comprising computer executable instructions which when executed by a computer cause the computer to perform a method of authentication, the method performed with a first lightweight node on a decentralized network that has a plurality of lightweight nodes, including at least the first lightweight node and a second lightweight node, the method comprising:
transmitting at least a first nonce to the second lightweight node;
receiving from the second lightweight node at least a public key associated with the second lightweight node, an identifier associated with a block of a blockchain in which an enrollment of the second lightweight node was recorded, an intermediate merkle tree hash associated with the second lightweight node, and a signature created with at least the first nonce and a private key associated with the second lightweight node;
determining if the block is referenced on a revocation list that identifies one or more revoked public keys, and:
(a) if the block is referenced then determining if a data merkle root stored on the revocation list for the block matches a data merkle root computed with at least the public key and the intermediate merkle tree hash; and
(b) if the two data merkle roots match then determining if a hash of the public key and a validity value indicating revocation matches a hash on the intermediate hash and responsive to a match determining that the public key is revoked and that the second lightweight node cannot be authenticated;

whereby:

if the block is not referenced on the revocation list, then determining if a data merkle root stored on the revocation list for the registered block matches a data merkle root computed with at least the public key and the intermediate merkle tree hash; and if the block is referenced on the revocation list, determining that the public key is enrolled on the decentralized network.

9. The non-transitory computer readable medium of claim 8, further comprising:

verifying the signature with at least the public key associated with the second lightweight node; and upon successful verification, determining that the second lightweight node is authentic.

10. The non-transitory computer readable medium of claim 8 wherein at least one said block comprises a header, the header including at least a hash of a previous block and a transaction merkle root.

11. The non-transitory computer readable medium of claim 10 where the transaction merkle root includes a root hash of:

(1) a revocation list that includes data regarding at least revoked public keys, and (2) a transaction merkle tree with one or more leaf nodes that are hashes of data that represent at least transaction data.

12. The non-transitory computer readable medium of claim 8 where a body of a block that is most recently added to the blockchain includes at least a revocation list for identifying public keys that have been revoked on a decentralized network.

13. The non-transitory computer readable medium of claim 12 wherein the revocation list has an entry for each block of the blockchain that is associated with a revoked public key.

14. The non-transitory computer readable medium of claim 13 where the entry includes at least an identifier of the block associated with the entry, one or more identifiers associated with one or more public keys associated with the block that have been revoked, and a data merkle root for the block that has been updated with indicators of the one or more revoked public keys.

* * * * *